(12) United States Patent
Xie et al.

(10) Patent No.: US 9,754,208 B2
(45) Date of Patent: Sep. 5, 2017

(54) AUTOMATIC RULE COACHING

(71) Applicant: Wal-Mart Stores, Inc., Bentonville, AR (US)

(72) Inventors: Jun Xie, San Jose, CA (US); Chong Sun, Redwood City, CA (US); Fan Yang, Redwood City, CA (US); Narasimhan Rampalli, Los Altos, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 502 days.

(21) Appl. No.: 14/475,470

(22) Filed: Sep. 2, 2014

(65) Prior Publication Data

US 2016/0063386 A1    Mar. 3, 2016

(51) Int. Cl.
G06F 15/18    (2006.01)
G06N 5/02    (2006.01)
G06N 99/00    (2010.01)
G06K 9/62    (2006.01)
G06N 7/00    (2006.01)

(52) U.S. Cl.
CPC ............. *G06N 5/02* (2013.01); *G06K 9/6256* (2013.01); *G06K 9/6269* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS 7,318,162 B2    1/2008    Rineer et al.
7,603,331 B2    10/2009   Tuzhilin et al.
7,669,133 B2    2/2010    Chikirivao et al.
(Continued)

OTHER PUBLICATIONS

Chimera: LargeScale Classification using Machine Learning, Rules, and Crowdsourcing—=2014 Chong Sun1, Narasimhan Rampalli1 , Frank Yang1, AnHai Doan1 ;2 1@WalmartLabs, 2University of WisconsinMadison.*
(Continued)

*Primary Examiner* — Kakali Chaki
*Assistant Examiner* — Ababacar Seck
(74) *Attorney, Agent, or Firm* — Bryan Cave LLP

(57) ABSTRACT

A method of validating rules configured to be utilized in an information extraction application, including: receiving a plurality of labeled samples in a training database; for each of the rules in the rule database: (a) determining, for each of the data points of the plurality of labeled samples in the training database to which the rule applies, whether applying the rule to the data point has a positive or negative impact on matching an output for the data point based on the rule to the assured output of the labeled sample corresponding to the data point; (b) generating positive impact information for the rule based on the positive voters; (c) generating negative impact information for the rule based on the negative voters; and (d) determining a metric for the rule based on the quantity of the negative voters and the quantity of the positive voters; ranking the rules based on the metrics corresponding to the rules; and sending to a user for refinement one or more flagged rules of the rules that have a lowest ranking of the metric. Other embodiments are provided.

20 Claims, 15 Drawing Sheets

(56) References Cited

U.S. PATENT DOCUMENTS

| | | |
|---|---|---|
| 7,720,785 B2 | 5/2010 | Perng et al. |
| 8,751,424 B1 | 6/2014 | Wojcik et al. |
| 2009/0287512 A1* | 11/2009 | Bonissone ............. G06Q 10/10 705/4 |
| 2010/0161526 A1* | 6/2010 | Zhang .................... G06N 5/025 706/12 |
| 2011/0138312 A1* | 6/2011 | Yeh ................... G06F 17/30539 715/771 |
| 2013/0218853 A1 | 8/2013 | Bullis et al. |
| 2014/0149105 A1 | 5/2014 | Lamba et al. |

OTHER PUBLICATIONS

Machine Learning in Automated Text Categorization—2002 Fabrizio Sebastiani Consiglio Nazionale delle Ricerche, Italy.*

* cited by examiner

Rule Coacher

Vantec NexStar3 Aluminum 2.5" eSATA/USB 2.0 Hard Drive Enclosure -- Black — 401

Add a new rule — 403

PT Classification — 404  Normalization — 405

The Expected PT: hard_disk_drives — 402

Current System Output:

*Nothing to display*

Rule Coacher

Impact of White Rule: (brace|splint|sling)s?-->braces,_splints_&_slings ← 1030

Positive Impact on The following 35 Item(s):
1. 4 .25 x 36 inch sam splint - reusable - waterproof - 1 ea.
2. straps for patient slings patient room patient lift slings and accessories accessories
3. universal arm sling personal core orthopedic aids arm support
4. one piece commode sling with positioning strap patient room patient lift slings and accessories slings
5. atsurgicalcompany clavicle and shoulder brace in white
6. bell-horn cradle arm sling in blue
7. sling with head support and insert pocket patient room patient lift slings and accessories slings
8. podded u sling with head support patient room patient lift slings and accessories slings
9. canvas patient lift sling patient room patient lift slings and accessories slings
10. medline ort332001s aluminum metacarpal splint - left-small
11. scott specialties snoopy arm sling
12. bariatric heavy duty canvas sling with commode cutout patient room patient lift slings and accessories heavy duty slings
13. vertewrap low profile bock brace personal care orthopedic aids back braces
14. podded u sling patient room patient lift slings and accessories slings
15. nylon patient lift sling patient room patient lift slings and accessories slings
16. mercury 2148bk signature sling bag
17. one piece sling with positioning strop patient room patient lift slings and accessories slings
18. full body patient lift sling with commode cutout patient room patient lift slings and accessories slings
19. bariatric heavy duty canvas sling patient room patient lift slings and accessories heavy duty slings
20. full body patient lift sling patient room patient lift slings and accessories slings
see more

Negative Impact on the following 1 Item(s):
1. cooper hand tools campbell 193-3625215 06972 821 1-2 inch sling link 2900# carbon self

FIG. 10

Rule Coacher

Impact of Black Rule: patterns?-/->dresses ← 1030

Positive Impact on The following 2 Item(s):
1. simplicity pattern misses' special occasion misses' sewing pattern evening or day pullover dress in 2 lengths with trim variations, (6, 8, 10, 12, 14)
2. simplicity pattern misses' sportswear misses' knit dress in 2 lengths or tunic and pants sewing pattern, (10, 12, 14, 16, 18)

Negative Impact on The following 16 Item(s):
1. mccall's pattern children's and girl's dresses, chj (7, 8, 10, 12, 14) || dresses
2. mccall's pattern misses' and women's dresses, rr (18w, 20w, 22w, 24w) || dresses
3. mccall's pattern misses' lined dresses and flower, aax (4, 6, 8, 10) || dresses
4. mccall's pattern misses' and miss petite lined dresses in 2 lengths, (14, 16, 18, 20) || dresses
5. simplicity pattern girl's dresses, (3, 4, 5, 6) || dresses
6. mccall's pattern misses' and women's dresses and sash, rr (18w, 28w, 22w, 24w) || dresses
7. simplicity pattern misses' special occasion day or evening dresses in 2 lengths, (6, 8, 10, 12, 14) || dresses
8. simplicity pattern misses' special occasion dresses in 2 lengths with sash, (20w-28w) || dresses
9. simplicity pattern misses' special occasion day or evening dresses in 2 lengths with sash, (10, 12, 14, 16, 18) || dresses
10. mccall's pattern misses', miss petite, women's and women's petite dresses, rr (18w, 20w, 22w, 24w) || dresses
11. simplicity pattern pattern toddler's dresses, (1/2, 1, 2, 3, 4) || dresses
12. simplicity pattern girl's and girl's plus dresses, (8-1/2, 16-1/2) || dresses
13. mccall's pattern children's and girls' top, dress, or jumper and pants, c1 (6, 7, 8) || dresses
14. simplicity pattern toddler dresses, (4, 5, 6, 7, 8) || dresses
15. simplicity pattern toddler dresses, (1/2, 1, 2, 3) || dresses
16. simplicity pattern misses' special occasion day or evening dresses in 2 lengths with sash, (14, 16, 18, 20, 22) || dresses

FIG. 11

Rule Coacher

White Rules Recommended for Refinement

| Rule Reg. Exp. | PT Prediction | Right | Wrong | Metric | Potential PTs [# votes] |
|---|---|---|---|---|---|
| (pet)? ?(live)? ?((small)? ?(animals|pets?)) | pet_live_animals | 1 | 838 | 838 | pet_flea_&_tick_treatments[57]; dog_toys[56] |
| books? | books | 1 | 711 | 711 | writing_notebooks_&_sketch_books[197]; record_books_&_ledgers[66] |
| cargo liner | automotive_carpet_&_flooring | 0 | 542 | 602 | truck_bed_liners[543] |
| string | string_&_twine | 3 | 1717 | 572 | electric_guitars[858]; electric_bass_guitars[356] |
| can liner | basket_liners | 0 | 398 | 442 | garbage_bags[375]; garbage_cans_&_wastebaskets[24] |
| (raw )?rubber | rubber_raw_materials | 0 | 396 | 440 | musical_instrument_mouthpieces[34]; necklaces[26] |
| (mini(ature)?|replica) helmets? | figurines_&_knick-knacks | 0 | 312 | 347 | sport_helmets[244]; autographed_collectibles[35] |
| films? | movies | 0 | 308 | 342 | plaques_&_signs[85]; multifunction_&_office_machines[32] |
| canop(y|ies)? | awnings | 0 | 216 | 240 | patio_umbrellas[37]; picture_frames[31] |
| gas(oline)? | liquid_fuels | 0 | 232 | 232 | pet_apparel[56]; clothes_dryers[31] |
| (smoking )?pipes? | tobacco_&_pipe_pouches_&_jars | 1 | 228 | 228 | threading_dies[78]; threading_taps[50] |
| cat food | bird_food | 0 | 193 | 214 | cat_food[189]; dog_food[2] |
| scotch(es)? | liquor_&_spirits | 0 | 142 | 158 | abrasive_wheels_&_discs[61]; cleaning_sponges_&_scrubbing_pads[11] |
| scotch | liquor_&_spirits | 0 | 142 | 158 | abrasive_wheels_&_discs[61]; cleaning_sponges_&_scrubbing_pads[11] |
| kohler.*handles? | door_handle_sets | 4 | 558 | 140 | faucets[551]; valves[3] |

FIG. 12

Rule Coacher

Black Rules Recommended for Refinement 1340

| Rule Reg. Exp. 1241 | PT Prediction 1242 | Right 1243 | Wrong 1244 | Metric 1245 |
|---|---|---|---|---|
| tabs? | index_dividers | 0 | 354 | 393 |
| faucets? | sinks | 3 | 1026 | 342 |
| panels? | desks | 1 | 187 | 187 |
| drains? | sinks | 2 | 320 | 160 |
| showers? | showerheads_&_handheld_showers | 10 | 1429 | 142 |
| futon (ottoman )?covers? | futon_frames_&_sets | 0 | 121 | 134 |
| torque | wrenches | 1 | 133 | 133 |
| bands? | rings | 19 | 1973 | 103 |
| vanit(y|ies) | mirrors | 1 | 74 | 74 |
| sun ?glass(es)? | sunglasses | 8 | 536 | 67 |
| books? | sheet_music | 5 | 317 | 63 |
| arms? | desk_chairs | 3 | 176 | 58 |
| ipod | cell_phone_&_mp3_player_cases | 5 | 277 | 55 |
| windows? | outdoor_flags_&_banners | 0 | 47 | 52 |
| counter ?tops? | sinks | 0 | 45 | 50 |

FIG. 13

AUTOMATIC RULE COACHING

TECHNICAL FIELD

This disclosure relates generally to information extraction systems, and relates more particularly to rule-based information extraction systems.

BACKGROUND

Information extraction system systems generally extract discrete pieces of information manually, automatically with a machine learning-based approach, and/or automatically with a rules-based approach. A rules-based approach utilizes human knowledge and represents such knowledge in the form of rules. The accuracy of these rules can affect the accuracy of the information extracted using the rules. Developing highly accurate rules can be a laborious process and can be error prone. Even for a well-trained analyst, the interactions between multiple rules can be complex. As such, the rule creation process can be extremely time consuming and require many iterations. As the scale of the data and the number of rules continues to grow, it becomes difficult for analysts to consider all of the created rules and their effects.

BRIEF DESCRIPTION OF THE DRAWINGS

To facilitate further description of the embodiments, the following drawings are provided in which:

FIG. 4 illustrates an exemplary display window for entering an assured output for a data point, according to the embodiment of FIG. 3;

FIG. 10 illustrates an exemplary display window for displaying an impact of a whitelist rule on labeled samples in a training database, according to the embodiment of FIG. 3;

FIG. 11 illustrates an exemplary display window for displaying an impact of a blacklist rule on labeled samples in the training database, according to the embodiment of FIG. 3;

FIG. 12 illustrates an exemplary display window for showing whitelist rules in the rules database that are recommended for refinement, according to the embodiment of FIG. 3, according to the embodiment of FIG. 3;

FIG. 13 illustrates an exemplary display window for showing blacklist rules in the rules database that are recommended for refinement;

Figure 1:
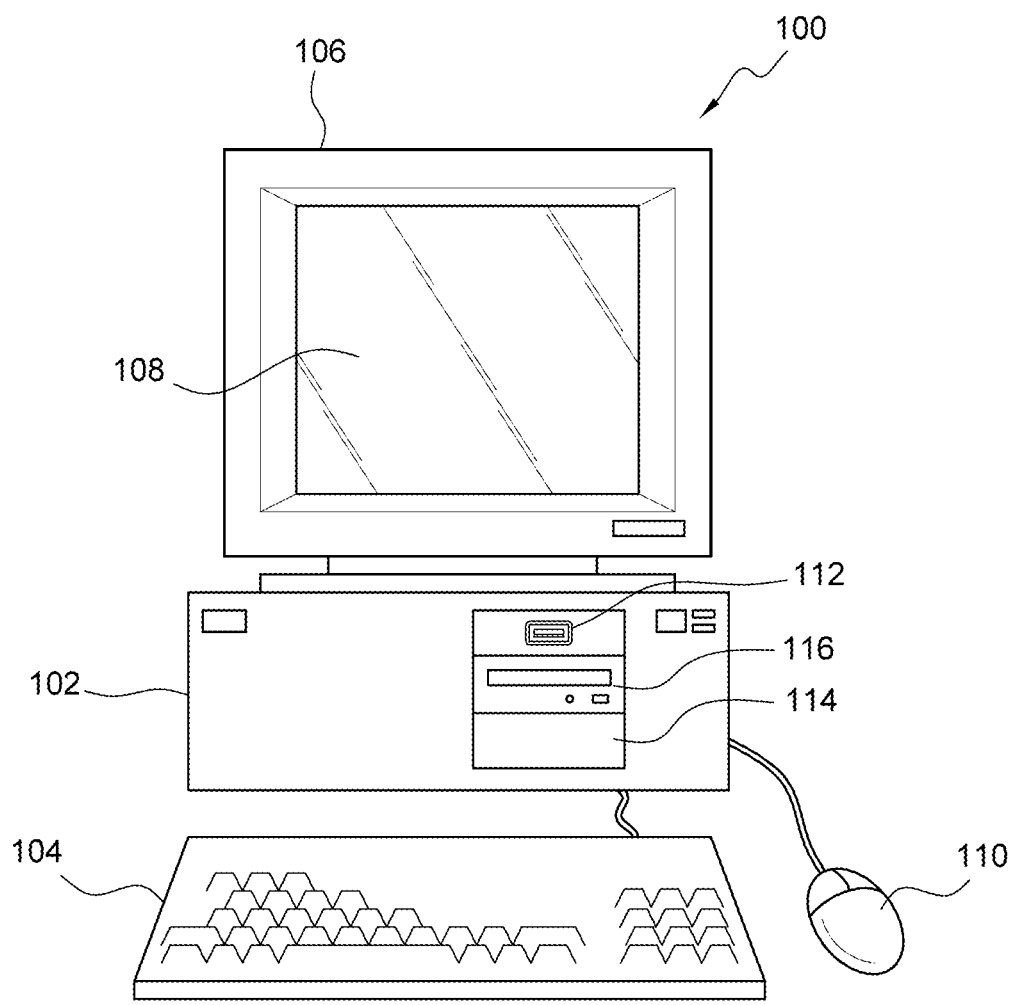
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiment include a method of validating rules configured to be utilized in an information extraction application. The rules can be stored in a rules database. The method can be implemented via execution of computer instructions configured to run at one or more processing modules and configured to be stored at one or more non-transitory memory storage modules. The method can include receiving a plurality of labeled samples in a training database. Each of the plurality of labeled samples can include a different data point and an assured output. The assured output can correspond to the data point for the information extraction application. The method also can include, for each of the rules in the rule database, determining, for each of the data points of the plurality of labeled samples in the training database to which the rule applies, whether applying the rule to the data point has a positive impact on matching an output for the data point based on the rule to the assured output of the labeled sample corresponding to the data point, such that the data point is a positive voter, or whether applying the rule to the data point has a negative impact on matching the output for the data point based on the rule to the assured output of the labeled sample corresponding to the data point, such that the data point is a negative voter. The method further can include, for each of the rules in the rule database, generating positive impact information for the rule based on the positive voters, wherein the positive impact information include a quantity of the positive voters. The method also can include, for each of the rules in the rule database, generating negative impact information for the rule based on the negative voters, wherein the negative impact information comprises a quantity of the negative voters. The method further can include, for each of the rules in the rule database, determining a metric for the rule based on the quantity of the negative voters and the quantity of the positive voters. The method also can include ranking the rules based on the metrics corresponding to the rules. The method further can include sending to a user for refinement one or more flagged rules of the rules that have a lowest ranking of the metric. The method also can include receiving from the user one or more refined rules. The method further can include generating a first output for a first data point in an information database based on the rules in the rules database. The rules in the rules database can include the one or more refined rules. The plurality of labeled samples in the training database can be devoid of the first data point. The method also can include receiving a request for information from a second user. The method further can include presenting the first output to the second user in response to the request.

A number of embodiments include a method of validating rules configured to be utilized in an information extraction application. The method can be implemented via execution of computer instructions configured to run at one or more processing modules and configured to be stored at one or more non-transitory memory storage modules. The method can include sending to a user a first data point for the information extraction application. The method also can include receiving from the user a first assured output corresponding to the first data point for the information extraction application based on human knowledge of the user. The method further can include storing the first data point and the first assured output as a first labeled sample in a training database. The training database can include a plurality of labeled samples each for a different data point and an assured output. The assured output can correspond to the first data point for the information extraction application. The method also can include generating a first output for the first data point based on a first set of rules in a rules database comprising the rules configured to be utilized in the information extraction application. The method further can include sending to the user the first output for the first data point. The method also can include receiving from the user one of: (1) a first new rule for the information extraction application of the first data point based on the human knowledge of the user, or (2) a first updated existing rule that is a modification of one of the existing rules in the rule database. One of the first new rule or the first updated existing rule can be a user-inputted rule. The method further can include storing the user-inputted rule in the rules database. The method also can include sending to the user an updated output for the first data point based on the rules in the rules database. The rules in the rules database can include the user-inputted rule and the first set of rules. The method further can include determining, for each of the data points of the plurality of labeled samples in the training database to which the user-inputted rule applies, whether applying the user-inputted rule to the data point has a positive impact on matching an output for the data point based on the user-inputted rule to the assured output of the labeled sample corresponding to the data point, such that the data point is a positive voter, or whether applying the user-inputted rule to the data point has a negative impact on matching the output for the data point based on the user-inputted rule to the assured output of the labeled sample corresponding to the data point, such that the data point is a negative voter. The method also can include generating positive impact information for the user-inputted rule based on the positive voters. The method further can include generating negative impact information for the user-inputted rule based on the negative voters. The method also can include sending to the user the positive and negative impact information for the user-inputted rule.

Several embodiments can include a system for validating rules configured to be utilized in an information extraction application. The rules can be stored in a rules database. The system can include one or more processing modules and one or more non-transitory memory storage modules storing computing instructions configured to run on the one or more processing modules and perform certain acts. The acts can include receiving a plurality of labeled samples in a training database. Each of the plurality of labeled samples can include a different data point and an assured output. The assured output can correspond to the data point for the information extraction application. The acts also can include, for each of the rules in the rule database, determining, for each of the data points of the plurality of labeled samples in the training database to which the rule applies, whether applying the rule to the data point has a positive impact on matching an output for the data point based on the rule to the assured output of the labeled sample corresponding to the data point, such that the data point is a positive voter, or whether applying the inputted rule to the data point has a negative impact on matching the output for the data point based on the rule to the assured output of the labeled sample corresponding to the data point, such that the data point is a negative voter. The acts further can include, for each of the rules in the rule database, generating positive impact information for the rule based on the positive voters. The positive impact information can include a quantity of the positive voters. The acts also can include, for each of the rules in the rule database, generating negative impact information for the rule based on the negative voters. The negative impact information can include a quantity of the negative voters. The acts further can include, for each of the rules in the rule database, determining a metric for the rule based on the quantity of the negative voters and the quantity of the positive voters. The acts also can include ranking the rules based on the metric of the rules. The acts further can include sending to a user for refinement one or more flagged rules of the rules that have a lowest ranking of the metric.

Figure 2:
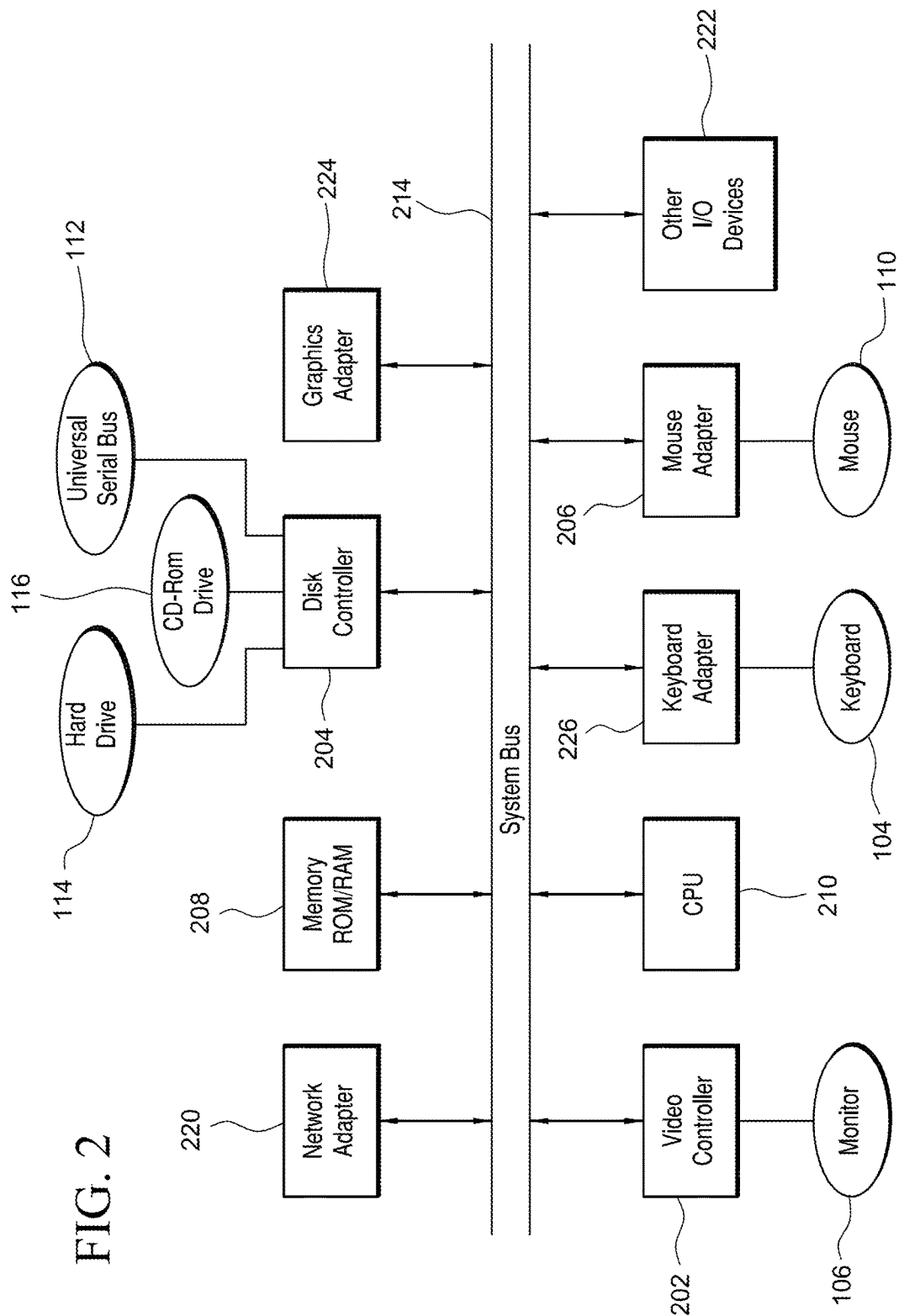
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
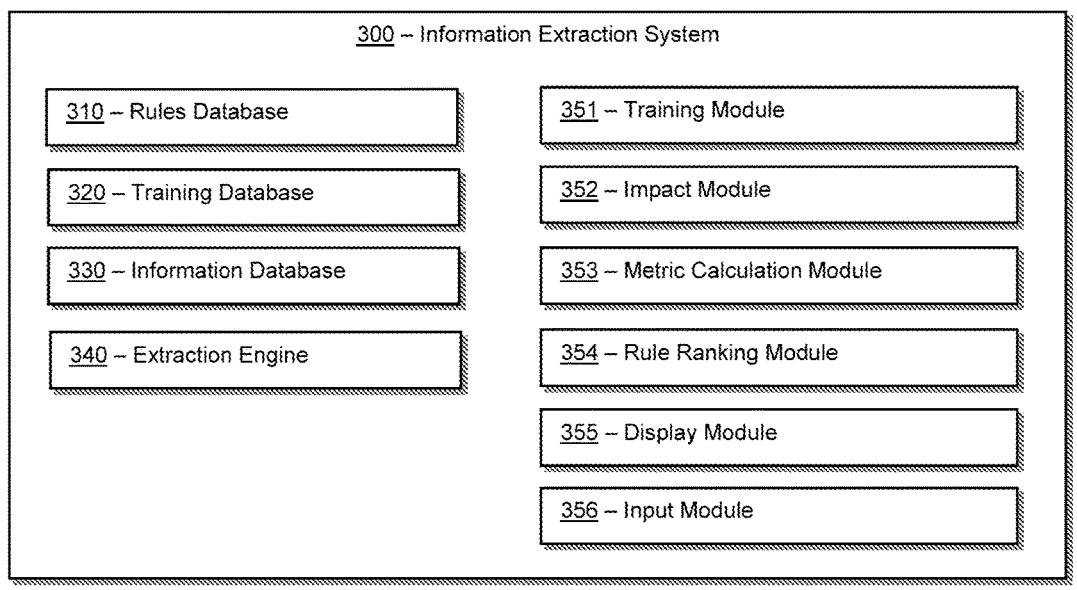
FIG. 3 illustrates a block diagram of an exemplary information extraction system, which can be employed for validating rules configured to be utilized in an information extraction application, according to an embodiment.

Turning ahead in the drawings, FIG. 3 illustrates a block diagram of an exemplary information extraction system 300, which can be employed for validating rules configured to be utilized in an information extraction application, according to an embodiment. Information extraction system 300 is merely exemplary, and embodiments of the information extraction system and elements thereof are not limited to the embodiments presented herein. The information extraction system and elements thereof can be employed in many different embodiments or examples not specifically depicted or described herein. In some embodiments, certain elements or modules of information extraction system 300 can perform various procedures, processes, and/or activities. In other embodiments, the procedures, processes, and/or activities can be performed by other suitable elements or modules of information extraction system 300.

In many embodiments, information extraction system 300 be a computer system, such as computer system 100 (FIG. 1), as described above, and can each be a single computer, a single server, or a cluster or collection of computers or servers, or a cloud of computers or servers. In a number of embodiments, information extraction system 300 can include a rules database 310, a training data base 320, an information database 330, and/or an extraction engine 340. In some embodiments, information database 330 can store data points, such as data points from which information can be extracted using information extraction system 300. In a number of embodiments, extraction engine 340 can be used to extract information from the data points stored in information database 330 using one or more rules, which can be stored in rules database 310.

In many embodiments, the rules stored in rules database 310 can be developed based on human knowledge and can include a condition and an output. In several embodiments, the extraction engine 340 can determine if the condition of the rule is met for a data point in information database 330, and if so, can associate the output generated by the one or more rules for a data point to information database 330. In many embodiments, the output given by the rule can be stored in information database 330. In some embodiments, a rule can apply to a data point if the data point is covered by the condition of the rule. In several embodiments, rules database 310 can include whitelist rules and blacklist rules. A whitelist rule r→t can assign the output t to any data point that matches the condition r (e.g., a regular expression pattern). A blacklist rule r–/–>t can provide that if a data point matches the condition r (e.g., a regular expression pattern), then that data point does not have the output t. In many embodiments, the prohibition of an output provided by a blacklist rule can override the assignment of that output by one or more of the whitelist rules.

In many embodiments, extraction engine 340 can utilize the rules stored in rules database 310 to perform an information extraction application. In some embodiments the information extraction application can be a classification of the data points in information database 330, such as a product type classification. For a product type classification, the data points can be descriptions of products, such as descriptions of products that have been entered by sellers of products, and rules can be used to classify the products into various product types in a product type taxonomy based on the product descriptions. For example, a rule can be "wedding bands?→rings," which can classify any data point having a description that matches the "wedding bands?" regular expression pattern to the product type of "rings" in a product type taxonomy. In other embodiments, the information extraction application can be a normalization of the data points in information database 330. For data normalization, a text string of data can be normalized by performing a conversion to modify at least a portion of the text string of data to a standard text string. For example, the data points can be attribute values of a product, such as values that describe the color of the product, values that describe the brand of the product, values that describe the size of the product, etc. The values can be normalized using the rules to ensure that the product attribute values are standard. For example, the rules can convert units to a standard unit value, such that inch, in, ", and/or ins, each of which represent units of inches, are converted to" for consistency. As another example, stemming can be used to convert product attribute values to their root form. As yet another example, variations of a word can be converted to a standard word. For example, colors can be limited to 15 standard colors, such that "fish white" can be converted to "white," "bronze" can be converted to "brown," etc. In yet other embodiments, the information extraction application can be another suitable information extraction application, such as another suitable classification, conversion, verification, or validation application.

In several embodiments, one or more users can interface with information extraction system 300 to create rules in rules database 310. For example, the users can be experts that apply human knowledge to create rules for the information extraction application. In many embodiments, the users that create the rules in rules database 310 can be internal analysts, crowd sourced, and/or outsourced to other firms.

In various embodiments, the same or other users, can interface with information extraction system 300 to manually consider some of the data points in information database 330 and provide an assured output for the information extraction application based on human knowledge. In many embodiments, the users can consider data points one at a time. In some embodiments, information extraction system 300 can present data points to the user when none of the rules in rules database 310 apply to the data points. For example, if the information extraction application is product type classification, and the data point includes "TYR Hurricane C5 Wetsuit M/L," as a description of a product, a user can determine that the correct output of the information extraction application for that data point should be "wetsuits," signifying that the product described by the data point should be classified as a product type of "wetsuits." The resulting output specified by the user can be based on human knowledge and can be considered the assured output. In many embodiments, the data point analyzed by the user, and the assured output specified by the user can be stored in training database 320 as a labeled sample. In several embodiments, each labeled sample generated by a user can be added as training data to training database 320.

In various embodiments, information extraction system 300 can include one or more modules, such as modules 351-356, which are described below in further detail. In many embodiments, information extraction system 300 can interface with the users through display windows, which can be displayed on a screen, such as screen 108 (FIG. 1). In some embodiments, the display windows can be any form of display suitable for interfacing with the users. In many embodiments, the display windows can be presented in the form of a graphical user interface that allows the users to interact with various visual components to view data points, provide assured outputs, add rules, edit rules, delete rules, and other suitable activities. In some embodiments, the display windows can be provided through a web based service in the form of one or more web pages that the users can interact with to perform the same or other functions. In a number of embodiments, the display windows can be provided through a stand-alone software application, and can display graphical output associated with the software application.

Turning ahead in the drawings, FIG. 4 illustrates an exemplary display window 400 showing an interface for entering an assured output for a data point, in accordance with various embodiments. Display window 400 is merely exemplary, and embodiments for entering an assured output for a data point can be employed in many different embodiments or examples not specifically depicted or described herein. In some embodiments, display window 400 can include a data point box 401, which can display a data point from information database 330 (FIG. 3) to be analyzed by the user. In many embodiments, display window 400 can include an assured output box 402, in which the user can enter the assured output for the data point based on the information extraction application. For example, as shown in FIG. 4, the user can determine that a data point having a product description of "Vantec NexStar3 Aluminum 2.5" eSATA/USB 2.0 Hard Drive Enclosure—Black," as shown in data point box 401, should have an assured output in a product type (PT) classification of "hard_disk_drives," as shown in assured output box 402. Together, the data point and the assured output can be stored as a labeled sample in training database 320 (FIG. 3).

In many embodiments, display window 400 can include an add rule button 403, which can be selected to add a new rule to rules database 310 (FIG. 3), such as a rule that applies to the data point in data point box 401, as described below in further detail and shown in FIGS. 6-7. In several embodiments, display window 400 can include application selection buttons, such as a PT classification button 404, which can be used to select an information extraction application of product type classification, and a normalization button 405, which can be used to select an information extraction application of data normalization. In many embodiments, one of the application selection buttons (e.g. 404, 405) can be selected to run extraction engine 340 (FIG. 3) for the selected information extraction application on the data point in data point box 401 using the rules in rules database 310 (FIG. 3), as described below in further detail and shown in FIGS. 5 and 9.

Figure 5:
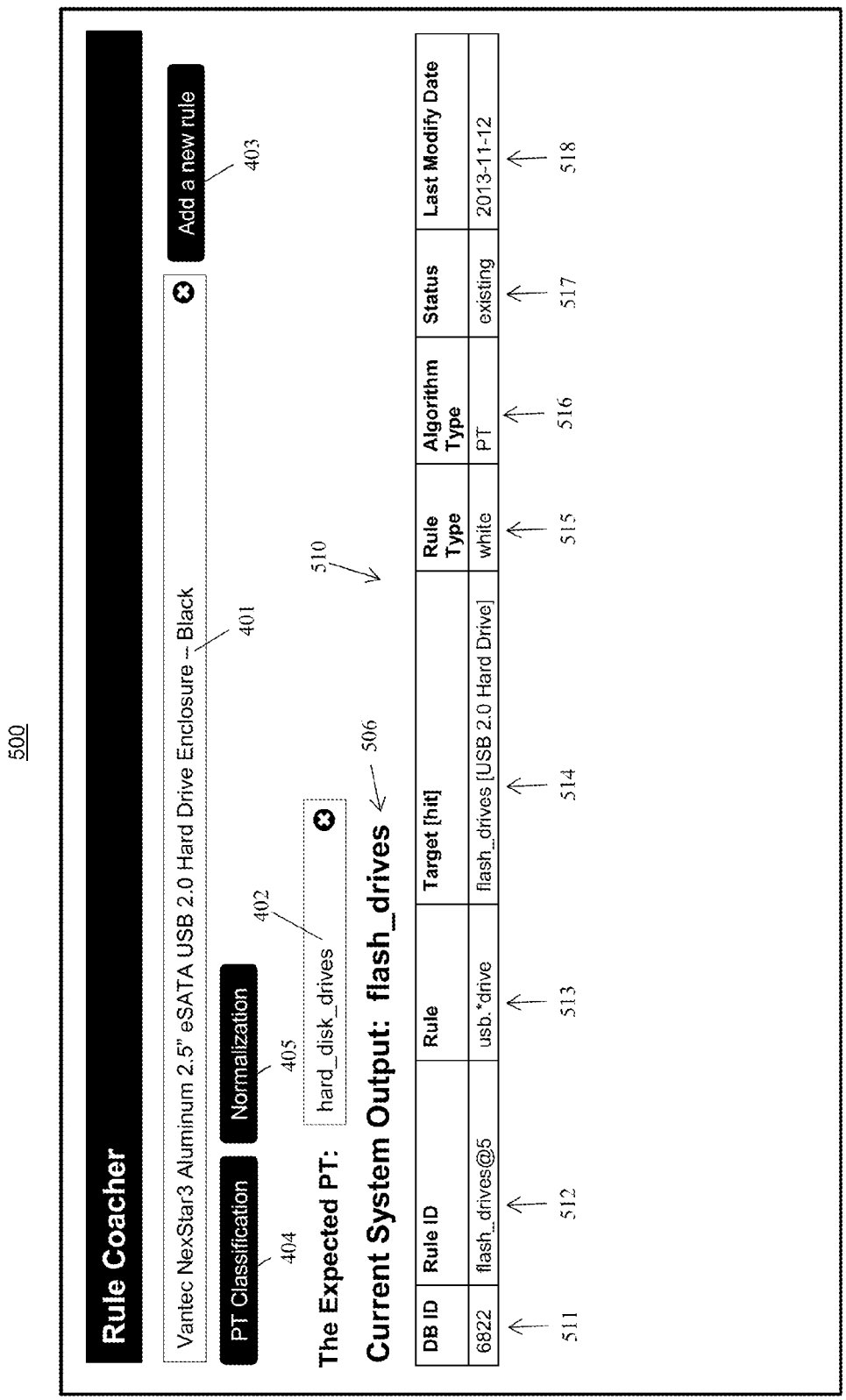
FIG. 5 illustrates an exemplary display window for displaying a generated output for a data point and for displaying the rules that apply to the data point, according to the embodiment of FIG. 3.

Turning ahead in the drawings, FIG. 5 illustrates an exemplary display window 500 showing an interface for displaying a generated output for a data point and for displaying the rules that apply to the data point, in accordance with various embodiments. Display window 500 is merely exemplary, and embodiments for displaying a generated output for a data point and for displaying the rules that apply to the data point can be employed in many different embodiments or examples not specifically depicted or described herein. Display window 500 can be similar to display window 400 (FIG. 4), and various components of display window 500 can be similar or identical to various components of display window 400 (FIG. 4). In many embodiments, display window 500 can display an update to display window 400 (FIG. 4) after the user selects one of the application selection buttons (e.g., PT classification button 404, normalization button 405). Specifically, as shown in FIG. 5, display window 500 can show an update to display window 400 after the user has selected PT classification button 404.

Upon selecting PT classification button 404, extraction engine 340 (FIG. 3) can determine which rules in rules database 310 (FIG. 3) apply to the data point in data point box 401. In a number of embodiments, display window 500 can include an applicable rules listing 510, which can list the rules in rules database 310 (FIG. 3) that apply to the data point in data point box 401. In many embodiments, applicable rules listing 510 can include various information regarding each of the applicable rules and/or information regarding how the applicable rules apply to the data point in data point box 401. For example, as shown in FIG. 5, applicable rules listing 510 can include a table with rows for the applicable rules and columns listing information about the applicable rules. As shown in FIG. 5, applicable rules listing 510 includes a single rule having a database identifier (DB ID) 511 of "6822," and a rule identifier 512 of "flash_drives@5." The rule has a condition 513 that is a regular expression pattern of "usb.*drive" and an output (or target) 514 of "flash_drives." The portion of the regular expression pattern that matches on the data point in data point box 401, which is called the hit, is "USB 2.0 Hard Drive." The rule has a rule type 515 of a whitelist (white) rule, and an information extraction application (algorithm type) 516 of product type classification. The rule has a status 517 of an existing rule in rules database 310. In some cases, a rule can be deleted, in which case the status of the rule can be changed to inactive. The rule can have a last modification date 518 listed, which in this case is "2013-11-12."

Based on the single applicable rule in rules database 310 (FIG. 3) for the data point in data point box 401, extraction engine 340 (FIG. 3) can determine that the output of running the data point in data point box 401 through the applicable rules is "flash_drives." In many embodiments, the output generated by extraction engine 340 (FIG. 3) can be displayed in generated output field 506. As shown in FIG. 5, the generated output listed in generated output field 506 and the assured output listed in assured output box 402 do not match. As such, the user can determine that the rules do not appropriately handle the data point in data point box 401. In many embodiments, the user can edit a rule listed in applicable rules listing 510 be clicking on the row that lists the rule, as described below and shown in FIG. 8. In some embodiments, to add a new rule, the user can select add rule button 403, as described below and shown in FIGS. 6-7.

Figure 6:
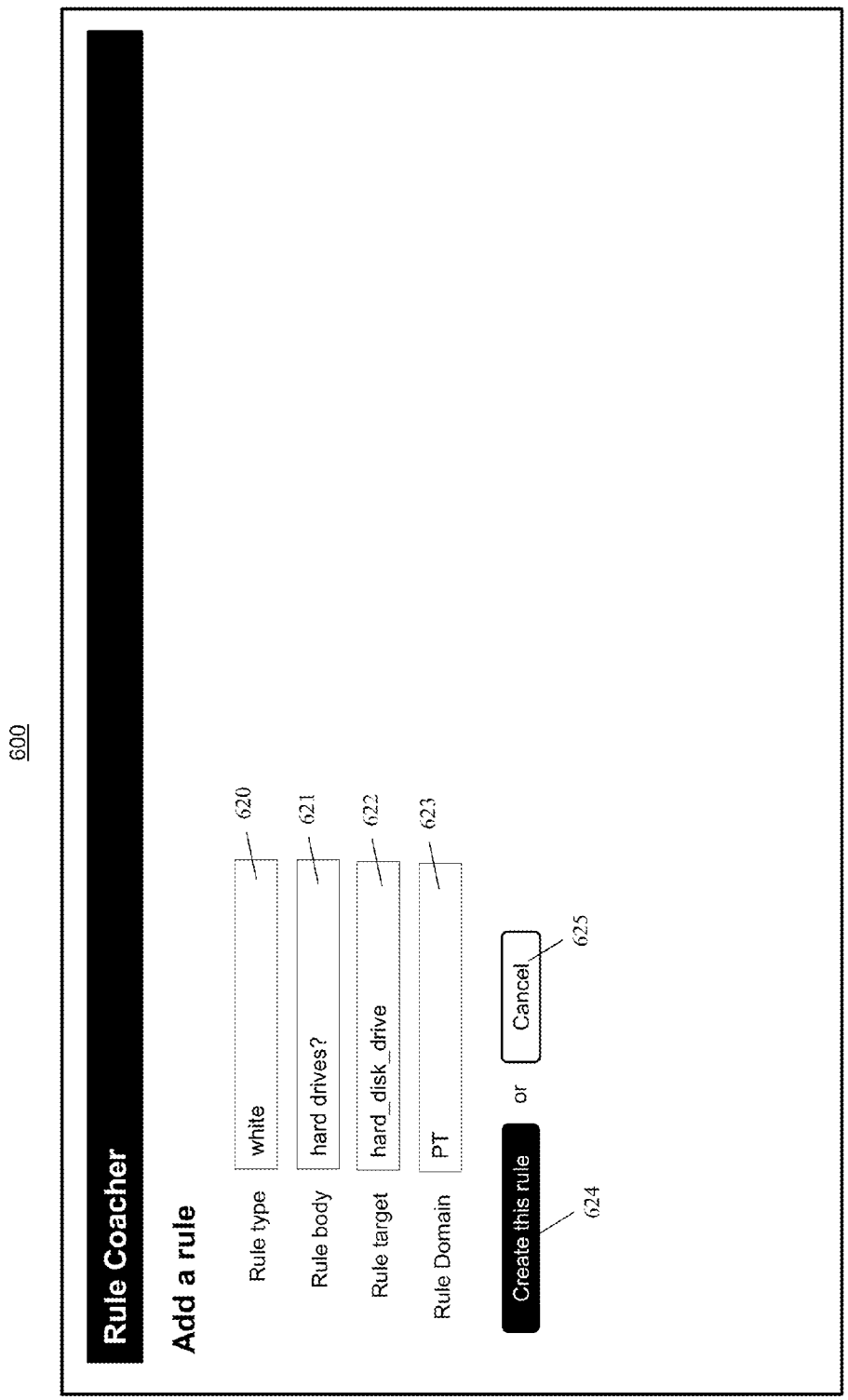
FIG. 6 illustrates an exemplary display window for adding a new rule, according to the embodiment of FIG. 3.

Turning ahead in the drawings, FIG. 6 illustrates an exemplary display window 600 showing an interface for adding a new rule, in accordance with various embodiments. Display window 600 is merely exemplary, and embodiments for adding a new rule can be employed in many different embodiments or examples not specifically depicted or described herein. In several embodiments, display window 600 can be displayed after the user selects add rule button 403 (FIG. 4-5). In a number of embodiments, display window 600 can include a rule type selection box 620, a rule body selection box 621, a rule target selection box 622, and/or a rule domain selection box 623. In many embodiments, rule type selection box 620 can be used to enter a type of rule for the new rule, such as a whitelist (white) rule or a blacklist (black) rule. In several embodiments, rule body selection box 621 can be used to enter a condition for the new rule, such as a regular expression pattern. In a number of embodiments, rule target selection box 622 can be used to enter an output (target) of the new rule. In some embodiments, rule domain selection box 623 can be used to select an information extraction application for the rule, such as product type classification or data normalization. In several embodiments, after entering the information in boxes 620-623, the new rule can be created by selecting a create rule button 624. Otherwise, the form can be exited without creating a rule by selecting a cancel button 625. As shown in FIG. 6, display window 600 can be used to create a new whitelist rule of "hard drives?→hard_disk_drive" to be used in product type classification. The new rule can be added to rules database 310 (FIG. 3).

Figure 7:
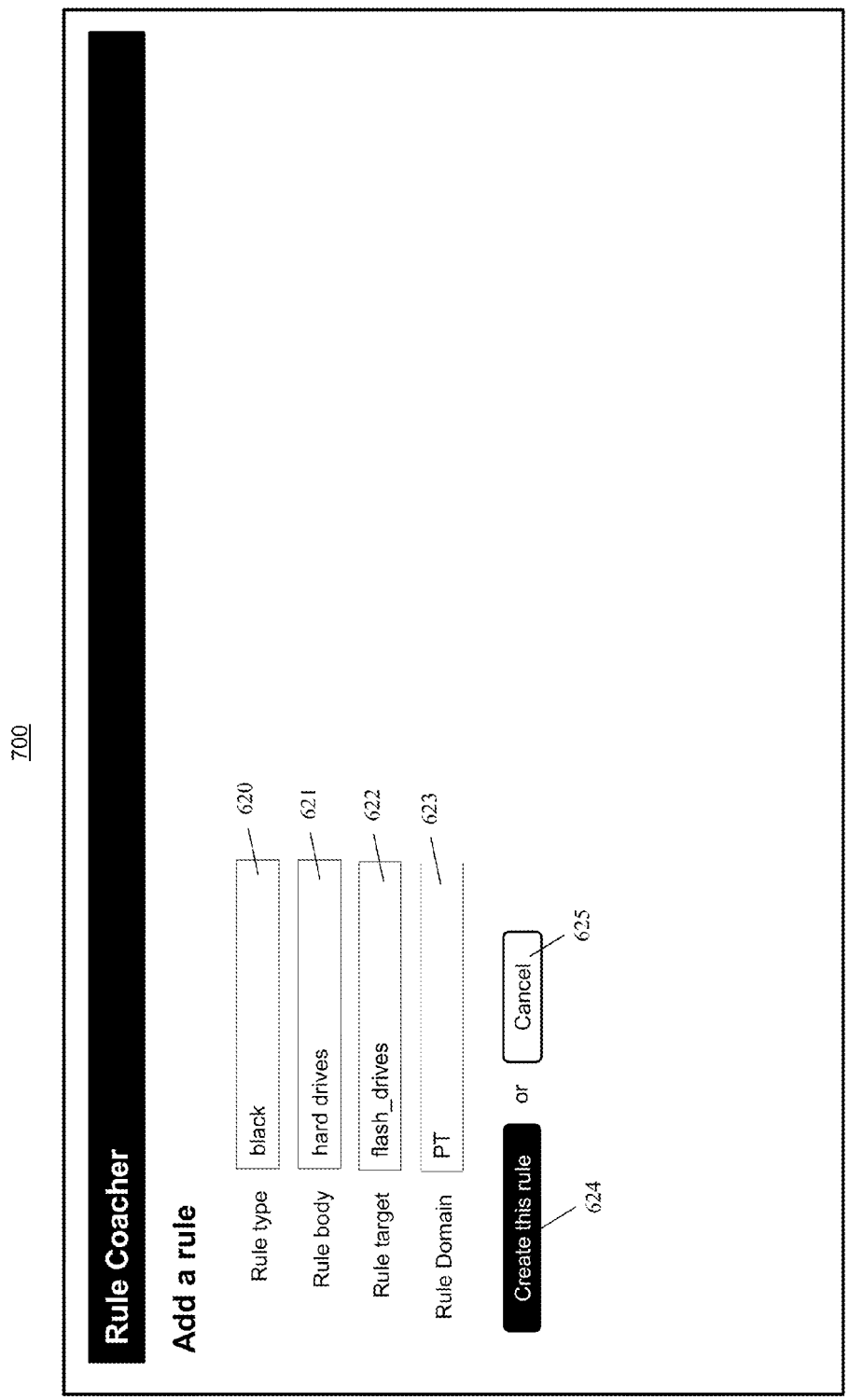
FIG. 7 illustrates an exemplary display window for adding a new rule, according to the embodiment of FIG. 3.

Turning ahead in the drawings, FIG. 7 illustrates an exemplary display window 700 showing an interface for adding a new rule, in accordance with various embodiments. Display window 700 is merely exemplary, and embodiments for adding a new rule can be employed in many different embodiments or examples not specifically depicted or described herein. Display window 700 can be similar to display window 600 (FIG. 6), and various components of display window 700 can be similar or identical to various components of display window 600 (FIG. 6). Display window 700 can be a separate instance of display window 600 (FIG. 6) that is displayed after the user selects add rule button 403 (FIG. 4-5). As shown in FIG. 7, display window 700 can be used to create a new blacklist rule of "hard drives-/->flash_drives" to be used in product type classification. The new rule can be added to rules database 310 (FIG. 3).

Figure 8:
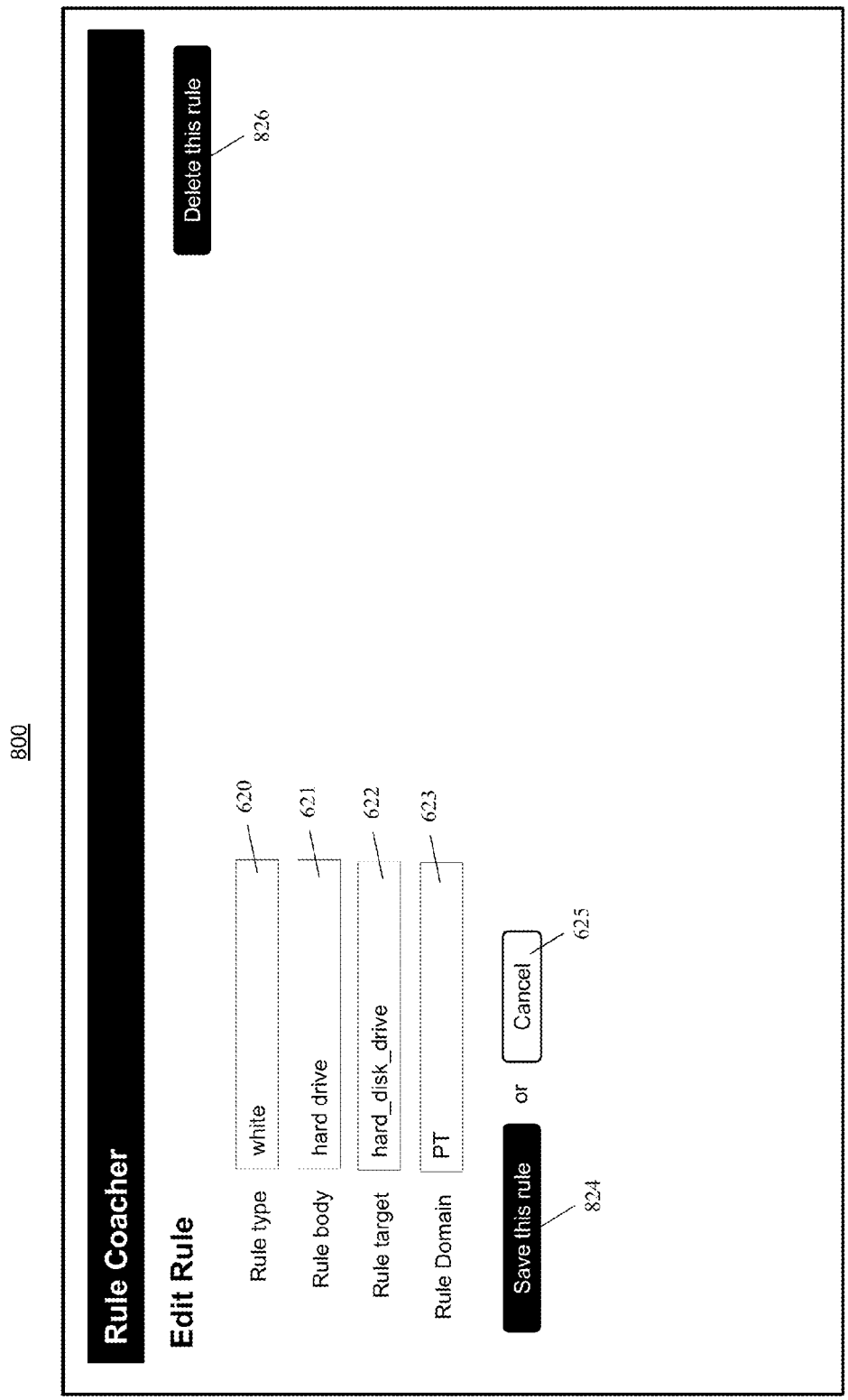
FIG. 8 illustrates an exemplary display window for editing a rule, according to the embodiment of FIG. 3.

Turning ahead in the drawings, FIG. 8 illustrates an exemplary display window 800 showing an interface for editing a rule, in accordance with various embodiments. Display window 800 is merely exemplary, and embodiments for editing a rule can be employed in many different embodiments or examples not specifically depicted or described herein. Display window 800 can be similar to display window 600 (FIG. 6) and/or display window 700 (FIG. 7), and various components of display window 800 can be similar or identical to various components of display window 600 (FIG. 6) and/or display window 700 (FIG. 7). In many embodiments, display window 800 can be displayed after the user selects a rule in applicable rules listing 510 (FIG. 5). As shown in FIG. 8, the user can edit the rule as provided in rule type selection box 620, rule body selection box 621, rule target selection box 622, and/or rule domain selection box 623. In several embodiments, after editing the information in boxes 620-623, the edited rule can be saved by selecting a save rule button 824. Otherwise, the form can be exited without creating a rule by selecting a cancel button 625. The edited rule can be updated in rules database 310 (FIG. 3). In some embodiments, display window 800 can include a delete rule button 826, which can be selected to delete the rule that was selected in applicable rules listing 510 (FIG. 5). In a number of embodiments, deleting the rule can remove the rule from rules database 310 (FIG. 3). In other embodiments, deleting the rule can flag the rule with an inactive status in rules database 310 (FIG. 3).

Figure 9:
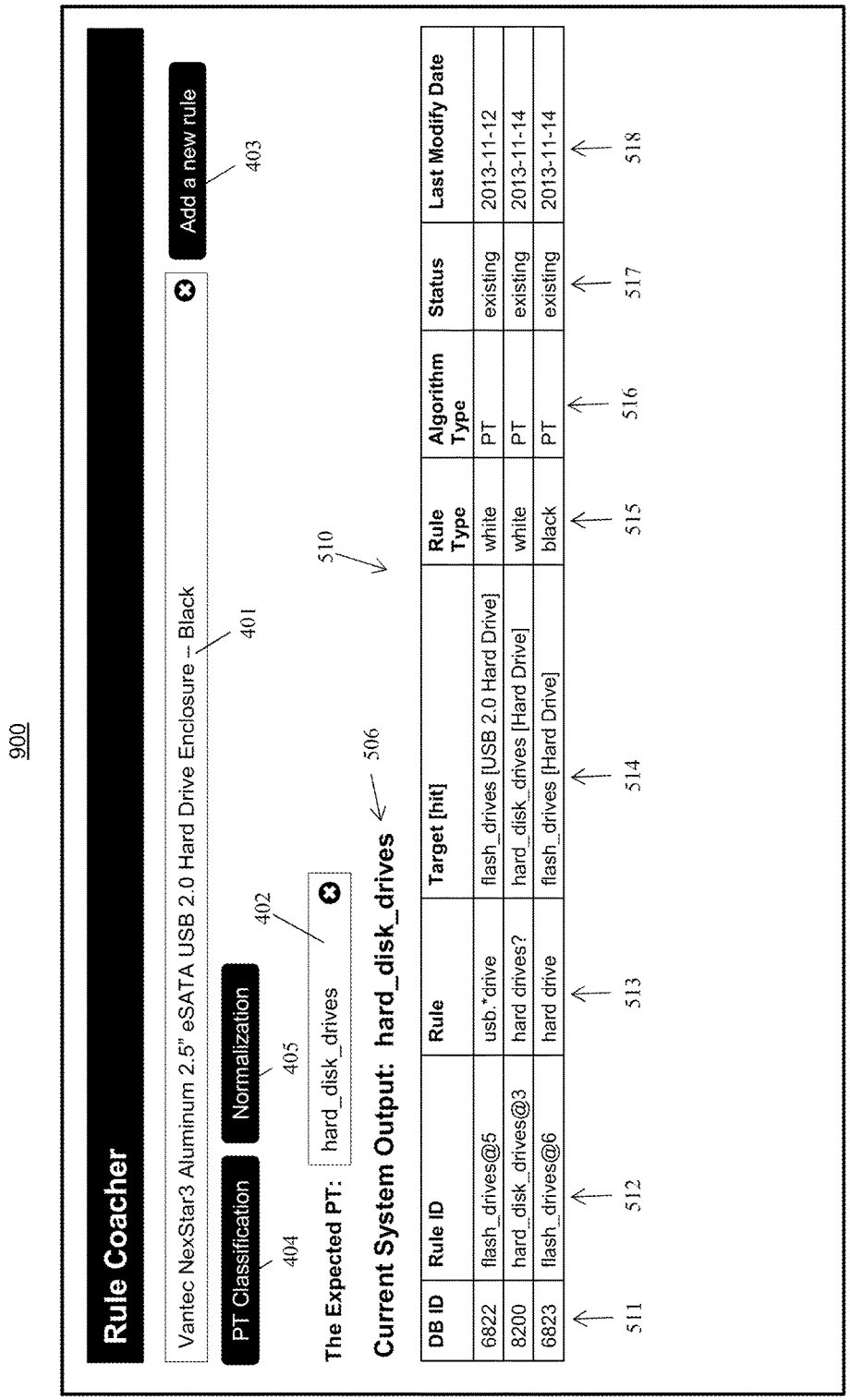
FIG. 9 illustrates an exemplary display window for displaying a generated output for a data point and for displaying the rules that apply to the data point, according to the embodiment of FIG. 3.

Turning ahead in the drawings, FIG. 9 illustrates an exemplary display window 900 showing an interface for displaying a generated output for a data point and for displaying the rules that apply to the data point, in accordance with various embodiments. Display window 900 is merely exemplary, and embodiments for displaying a generated output for a data point and the rules that apply to the data point can be employed in many different embodiments or examples not specifically depicted or described herein. Display window 900 can be similar to display window 400 (FIG. 4) and/or display window 500 (FIG. 5), and various components of display window 900 can be similar or identical to various components of display window 400 (FIG. 4) and/or display window 500 (FIG. 5). In many embodiments, display window 900 can display an update to display window 500 (FIG. 5) after the user adds one or more new rules, such as shown in FIGS. 6-7, and/or edits one or more rules, as shown in FIG. 8.

In several embodiments, extraction engine 340 (FIG. 3) can determine which rules in rules database 310 (FIG. 3), as updated, apply to the data point in data point box 401. In a number of embodiments, display window 900 can list the applicable rules in applicable rules listing 510, which can be an updated listing. As shown in FIG. 9, based on the three applicable rules in rules database 310 (FIG. 3) for the data point in data point box 401, extraction engine 340 (FIG. 3) can determine that the output of running the data point in data point box 401 through the applicable rules is "hard_disk_drives," as shown in generated output field 506. Based on the additional rules, the generated output in generated output field 506 has changed in FIG. 9 from the generated output in generated output field 506 in FIG. 5, which was "flash_drives." The user can note that the generated output in generated output field 402 matches the assured output in assured output box 402. As such, the user can determine that the rules now appropriately handle the data point in data point box 401. In many embodiments, the user can proceed to analyze a new data point, repeating one or more of the procedures described above and shown in FIGS. 4-9.

In many embodiments, information extraction system 300 can track for which data points the rules have a positive impact or a negative impact on matching the generated output to the assured output. In many embodiments, when a whitelist rule provides an output that is the same as the assured output, or when a blacklist rule rejects an output that is different from the assured output, the data point can be considered a positive voter for that rule. In several embodiments, when a whitelist rule provides an output that is different from the assured output, or when a blacklist rule rejects an output that is the same as the assured output, the data point can be considered a negative voter for that rule. As shown in FIG. 9, the first rule (DB ID=6822) is a whitelist rule that provides a different output ("flash_drives") than the assured output, and the data point in data point box 401 can thus be considered a negative voter for the first rule. The second rule (DB ID=8200), is a whitelist rule that provides the same output (hard_disk_drives) as the assured output, and the data point in data point box 401 can thus be considered a positive voter for the second rule. The third rule (DB ID=6823) is a blacklist rule that rejects a different output than the assured output, and the data point in data point box 401 can thus be considered a positive voter for the third rule.

Turning ahead in the drawings, FIG. 10 illustrates an exemplary display window 1000 showing an impact of a whitelist rule on labeled samples in training database 320 (FIG. 3), in accordance with various embodiments. Display window 1000 is merely exemplary, and embodiments for showing an impact of a whitelist rule on labeled samples can be employed in many different embodiments or examples not specifically depicted or described herein. In several embodiments, display window 1000 can be displayed after the user creates a new whitelist rule, such as shown in FIG. 6. In a number of embodiments, display window 1000 can be displayed when the user selects an existing whitelist rule in rules database 310 (FIG. 3).

In a number of embodiments, display window 1000 can include a rule field 1030, which can display the new whitelist rule created or the whitelist rule selected, as described above. For example, as shown in FIG. 10, rule field 1030 can include a whitelist rule of "(brace|splint|sling)s?→braces,_splints_&_slings." In many embodiments, information extraction system 300 (FIG. 3) can iterate through each of the labeled samples in training database 320, and determine whether the whitelist rule applies to the data point of the labeled sample. If the whitelist rule applies to the data point, information extraction system 300 (FIG. 3) can determine whether applying the whitelist rule to the data point has a positive impact on matching the generated output to the assured output that corresponds to the data point in the labeled sample (such that the data point is a positive voter for the whitelist rule, as described above), or whether applying the whitelist rule to the data point has a negative impact on matching the generated output to the assured output that corresponds to the data point in the labeled sample (such that the data point is a negative voter for the whitelist rule, as described above). In many embodiments, information extraction system 300 (FIG. 3) can generate positive impact information for the positive voters and/or can generate negative impact information for the negative voters for the whitelist rule. For example, the positive impact information can include the number of positive voters and/or a listing of the positive voters. The negative impact information can include the number of negative voters and/or a listing of the negative voters for the whitelist rule.

As shown in FIG. 10, display window 1000 can include a positive impact listing 1031, which can list the positive voters for the whitelist rule shown in rule field 1030, and/or can include a negative impact listing 1033, which can list the negative voters for the whitelist rule shown in rule field 1030. In many embodiments, display window 1000 can include a positive voter count 1032, which can indicate the number of positive voters. In several embodiments, display window 1000 can include a negative voter count 1034, which can indicate the number of negative voters. In many embodiments, each of the data points listed in positive impact listing 1031 can match the condition of the whitelist rule in rule field 1030, can be stored in a labeled sample in training database 320 (FIG. 3), and can be associated in the labeled sample with an assured output that matches the output of the whitelist rule in rule field 1030. In many embodiments, each of the data points listed in negative impact listing 1033 can match the condition of the whitelist rule in rule field 1030, can be stored in a labeled sample in training database 320 (FIG. 3), and can be associated in the labeled sample with an assured output that does not match the output of the whitelist rule in rule field 1030. As shown in FIG. 10, the number of positive voters is 35, as listed in positive voter count 1032, and the number of negative voters is 1, as listed in negative voter count 1034. Based on these numbers, the user can determine that the whitelist rule performs fairly well among the training data. In some embodiments, negative impact listing 1033 can include the assured output corresponding to each of the data points. The assured output can be an output entered by a user based on human knowledge.

Turning ahead in the drawings, FIG. 11 illustrates an exemplary display window 1100 showing an impact of a blacklist rule on labeled samples in training database 320 (FIG. 3), in accordance with various embodiments. Display window 1100 is merely exemplary, and embodiments for showing an impact of a blacklist rule on labeled samples can be employed in many different embodiments or examples not specifically depicted or described herein. Display window 1100 can be similar to display window 1000 (FIG. 10), and various components of display window 1100 can be similar or identical to various components of display window 1000 (FIG. 10). In several embodiments, display window 1100 can be displayed after the user creates a new blacklist rule, such as shown in FIG. 7. In a number of embodiments, display window 1100 can be displayed when the user selects an existing blacklist rule in rules database 310 (FIG. 3).

In a number of embodiments, rule field 1030 of display window 1100 can display the new blacklist rule created or the blacklist rule selected, as described above. For example, as shown in FIG. 11, rule field 1030 can include a blacklist rule of "patterns?-/->dresses." In many embodiments, information extraction system 300 (FIG. 3) can iterate through each of the labeled samples in training database 320, and determine whether the blacklist rule applies to the data point of the labeled sample. If the blacklist rule applies to the data point, information extraction system 300 (FIG. 3) can determine whether applying the blacklist rule to the data point has a positive impact on matching the generated output to the assured output that corresponds to the data point in the labeled sample (such that the data point is a positive voter for the blacklist rule, as described above), or whether applying the blacklist rule to the data point has a negative impact on matching the generated output to the assured output that corresponds to the data point in the labeled sample (such that the data point is a negative voter for the blacklist rule, as described above). In many embodiments, information extraction system 300 (FIG. 3) can generate positive impact information for the positive voters and/or can generate negative impact information for the negative voters for the blacklist rule. For example, the positive impact information can include the number of positive voters and/or a listing of the positive voters. The negative impact information can include the number of negative voters and/or a listing of the negative voters for the blacklist rule.

As shown in FIG. 11, positive impact listing 1031 of display window 1100 can list the positive voters for the blacklist rule shown in rule field 1030, and/or negative impact listing 1033 of display window 1100 can list the negative voters for the blacklist rule shown in rule field 1030. In many embodiments, positive voter count 1032 of display window 1100 can indicate the number of positive voters. In several embodiments, negative voter count 1034 of display window 1100 can indicate the number of negative voters. In many embodiments, each of the data points listed in positive impact listing 1031 can match the condition of the blacklist rule in rule field 1030, can be stored in a labeled sample in training database 320 (FIG. 3), and can be associated in the labeled sample with an assured output that does not match the output of the blacklist rule in rule field 1030, which is rejected by the blacklist rule. In many embodiments, each of the data points listed in negative impact listing 1033 can match the condition of the blacklist rule in rule field 1030, can be stored in a labeled sample in training database 320 (FIG. 3), and can be associated in the labeled sample with an assured output that matches the output of the blacklist rule in rule field 1030, which is rejected by the blacklist rule.

In some embodiments, negative impact listing 1033 can include the assured output corresponding to each of the data points. For example, as shown in FIG. 11, each of the data points has an assured output of "dresses," which is displayed after a "‖" for each data point. The assured output can be an output entered by a user based on human knowledge, and can be correct or incorrect, depending on what is entered by the user as assured outputs. In this case, each of the data points listed in the negative impact listing were incorrectly classified as dresses in training database 320 (FIG. 3) by one or more users. As such, the system indicates that each of these data points are negative voters under the rule provided in rule field 1030.

Turning ahead in the drawings, FIG. 12 illustrates an exemplary display window 1200 showing whitelist rules in rules database 310 (FIG. 3) that are recommended for refinement, in accordance with various embodiments. Display window 1200 is merely exemplary, and embodiments for showing whitelist rules recommended for refinement can be employed in many different embodiments or examples not specifically depicted or described herein. In several embodiments, information extraction system 300 (FIG. 3) can determine the number of positive voters and/or the number of negative voters of the data points in the labeled samples in training database 320 (FIG. 3) for each of the whitelist rules in rules database 310 (FIG. 3). In a number of embodiments, display window 1200 can be displayed when a user chooses to refine whitelist rules in rules database 310 (FIG. 3).

In several embodiments, information extraction system 300 can determine a metric for each whitelist rule based on the number of negative voters for the whitelist rule and the number of positive voters for the whitelist rule. For example, the metric can be calculated by dividing the number of negative voters by the number of positive voters, such that the higher the value of the metric, the worse the whitelist rule performs among the labeled samples in training database 320 (FIG. 3). In some embodiments, if the number of positive voters for the whitelist rule is 0, the metric can use another value, such as 0.9 as a divisor in order to avoid division by 0. In many embodiments, the whitelist rules can be ranked based on the value of the metric corresponding to each whitelist rule. In a number of embodiments, a subset of the whitelist rules with the worst-performing metric values can be flagged for refinement.

As shown in FIG. 12, display window 1200 can include a rule refinement listing 1240, which can include information about the subset of the whitelist rules that are flagged for refinement based on their metric values. In many embodiments, rule refinement listing 1240 can include a rule condition 1241 of each flagged whitelist rule, which can be a regular expression pattern. In several embodiments, rule refinement listing 1240 can include an output 1242 of each of the flagged whitelist rules. In a number of embodiments, rule refinement listing 1240 can include a positive voter count 1243, a negative voter count 1244, and/or a metric value 1245 for each of the flagged whitelist rules. In many embodiments, the flagged whitelist rules can be ordered in rule refinement listing 1240 by metric value 1245, such that the worst flagged whitelist rules are listed first.

In a number of embodiments, information extraction system 300 (FIG. 3) can determine, for each of the flagged whitelist rules, the most commonly occurring assured outputs that correspond to the data points that are negative voters for the flagged whitelist rule. These most commonly occurring assured outputs can be candidate outputs for the flagged whitelist rules. In many embodiments, rule refinement listing 1240 can include a candidate outputs listing 1246 for each of the flagged whitelist rules, which can show one or more of the candidate outputs. In a number of embodiments, candidate outputs listing 1246 can include, for each of the one or more candidate outputs, the number of assured outputs that correspond to the data points that are negative voters for the flagged whitelist rule.

In many embodiments, the user can view the flagged whitelist rules in rule refinement listing 1240 and can determine how to refine the flagged whitelist rules. For example, the user can edit the rule, such as shown in FIG. 8 and described above, to have a different condition and/or a different output. In many cases, the user can be guided by the candidate outputs listed in candidate outputs listing 1246 to choose a new output for the flagged whitelist rule. In some cases, the user can determine that the rule should be deleted, such as by using delete rule button 826 (FIG. 8). In some embodiments, if the flagged whitelist rule has a positive voter count 1243 of 0, the flagged whitelist rule can be automatically deleted by information extraction system 300 (FIG. 3).

In a number of embodiments, after each refinement of a flagged whitelist rule in rule refinement listing 1240, information extraction system 300 (FIG. 3) can iteratively update rule refinement listing 1240 with an updated subset of the whitelist rules with the worst metric values. In several embodiments, a whitelist rule can be flagged for refinement if the metric of the whitelist rule is above a predetermined threshold. For example the predetermined threshold can be 1, 0.9, 0.8, 0.7, 0.5, 0.3, 0.1, 0.05, or another suitable value. In many embodiments, a user can continue to refine the whitelist rules recommended for refinement listing in rule refinement listing 1240 until there are no additional whitelist rules that are above the predetermined threshold. At this point, the whitelist rules in rules database 310 (FIG. 3) can be high quality rules, as measured by the labeled samples in training database 320 (FIG. 3). As additional labeled samples are added to training database 320 (FIG. 3), such as shown in FIG. 4 and described above, information extraction system 300 (FIG. 3) can recalculate the metrics for the whitelist rules, re-rank the whitelist rules, and present whitelist rules to the user for further refinement.

Turning ahead in the drawings, FIG. 13 illustrates an exemplary display window 1300 showing blacklist rules in rules database 310 (FIG. 3) that are recommended for refinement, in accordance with various embodiments. Display window 1300 is merely exemplary, and embodiments for showing blacklist rules recommended for refinement can be employed in many different embodiments or examples not specifically depicted or described herein. Display window 1300 can be similar to display window 1200 (FIG. 12), and various components of display window 1300 can be similar or identical to various components of display window 1200 (FIG. 12). In several embodiments, information extraction system 300 (FIG. 3) can determine the number of positive voters and/or the number of negative voters of the data points in the labeled samples in training database 320 (FIG. 3) for each of the blacklist rules in rules database 310 (FIG. 3). In a number of embodiments, display window 1300 can be displayed when a user chooses to refine blacklist rules in rules database 310 (FIG. 3).

As described above for whitelist rules, information extraction system 300 can determine a metric for each blacklist rule based on the number of negative voters for the blacklist rule and the number of positive voters for the blacklist rule. For example, the metric can be calculated by dividing the number of negative voters by the number of positive voters, such that the higher the value of the metric, the worse the blacklist rule performs among the labeled samples in training database 320 (FIG. 3). In some embodiments, if the number of positive voters for the blacklist rule is 0, the metric can use another value, such as 0.9 as a divisor in order to avoid division by 0. In many embodiments, the blacklist rules can be ranked based on the value of the metric corresponding to each blacklist rule. In a number of embodiments, a subset of the blacklist rules with the worst metric values can be flagged for refinement.

As shown in FIG. 13, display window 1300 can include a rule refinement listing 1340, which can include information about the subset of the blacklist rules that are flagged for refinement based on their metric values. In many embodiments, rule refinement listing 1340 can include rule condition 1241 of each flagged blacklist rule, which can be a regular expression pattern. In several embodiments, rule refinement listing 1340 can include output 1242 of each of the flagged blacklist rules. In a number of embodiments, rule refinement listing 1340 can include positive voter count 1243, negative voter count 1244, and/or metric value 1245 for each of the flagged blacklist rules. In many embodiments, the flagged blacklist rules can be ordered in rule refinement listing 1340 by metric value 1245, such that the worst-performing flagged blacklist rules are listed first.

In many embodiments, the user can view the flagged blacklist rules in rule refinement listing 1340 and can determine how to refine the flagged blacklist rules, which can be similar to refinement of the flagged whitelist rules listed in rule refinement listing 1240 (FIG. 12). In a number of embodiments, after each refinement of a flagged blacklist rule in rule refinement listing 1340, information extraction system 300 (FIG. 3) can iteratively update rule refinement listing 1340 with an updated subset of the blacklist rules with the worst metric values. In several embodiments, a blacklist rule can be flagged for refinement if the metric of the blacklist rule is above a predetermined threshold, such as described above with respect to whitelist rules.

In many embodiments, information extraction system 300 (FIG. 3) can beneficially be used to debug, validate, and/or refine existing, modified, and/or new rules, which can facilitate providing high-quality rules in rules database 310 (FIG. 3). Information extraction system 300 (FIG. 3) can advantageously be used to debug, validate, and/or refine thousands or even millions of rules, the scope of which can be too large to be manually processed by humans. In many embodiments, information extraction system 300 (FIG. 3) can beneficially identify the impact of rules and recommend refinement based on an understanding of the outputs. In several embodiments, information extraction system 300 (FIG. 3) can advantageously provide a systematic process for quickly creating and refining rules with an extendable training data set, which can include thousands or even millions of labeled samples.

Figure 14:
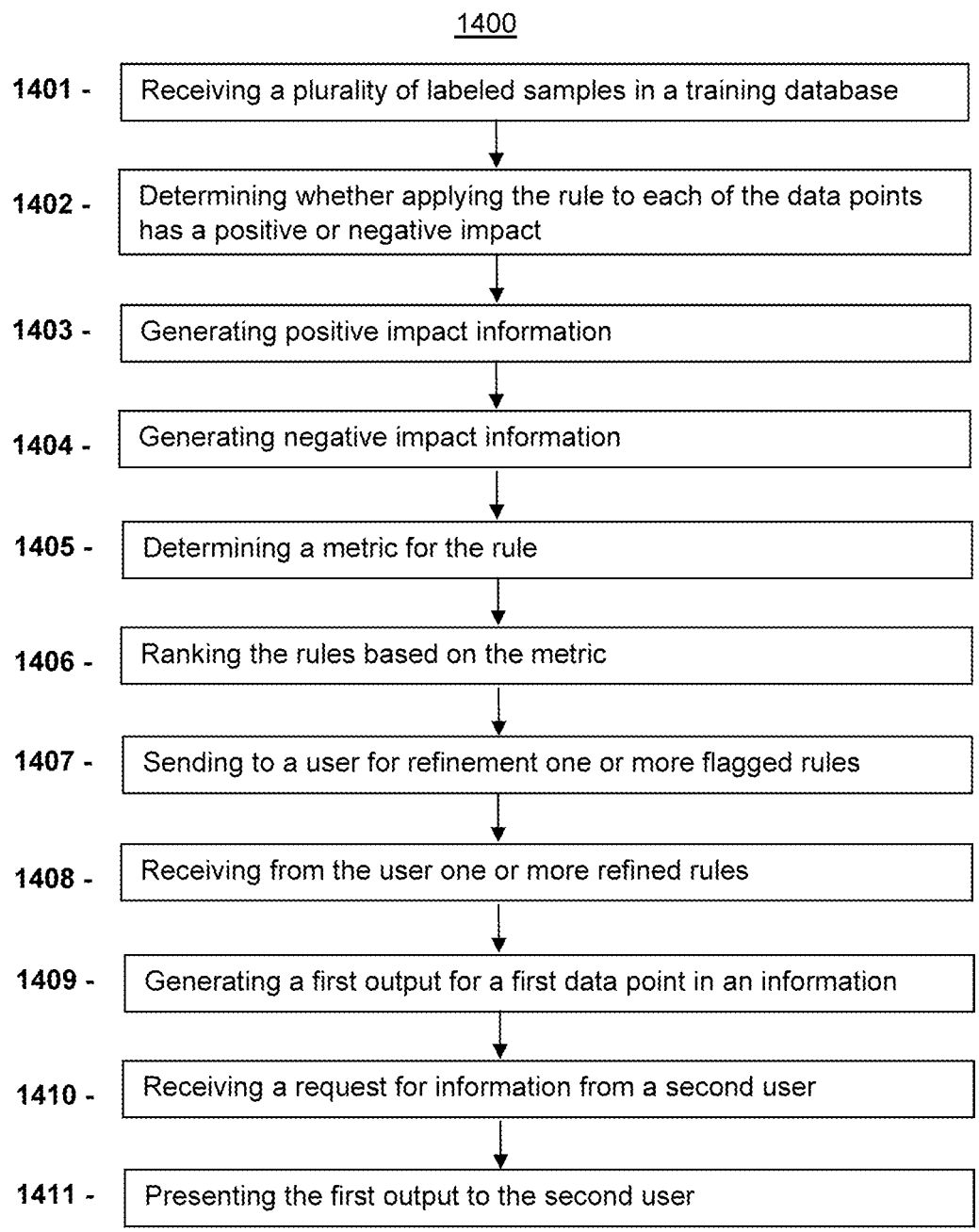
FIG. 14 illustrates a flow chart for a method of validating rules configured to be utilized in an information extraction application, according to another embodiment.

Turning ahead in the drawings, FIG. 14 illustrates a flow chart for a method 1400 of validating rules configured to be utilized in an information extraction application, according to an embodiment. Method 1400 is merely exemplary and is not limited to the embodiments presented herein. Method 1400 can be employed in many different embodiments or examples not specifically depicted or described herein. In some embodiments, the procedures, the processes, and/or the activities of method 1400 can be performed in the order presented. In other embodiments, the procedures, the processes, and/or the activities of method 1400 can be performed in any suitable order. In still other embodiments, one or more of the procedures, the processes, and/or the activities of method 1400 can be combined or skipped.

In some embodiments, method 1400 can be implemented by information extraction system 300 (FIG. 3). In some embodiments, the rules can be stored in a rules database. In many embodiments, the rules database can be similar or identical to rules database 310 (FIG. 3). In certain embodiments, the rules in the rules database can include whitelist rules and/or blacklist rules. In several embodiments, the information extraction application can be a product type classification. In a number of embodiments, the information extraction application can be a data normalization.

Referring to FIG. 14, in some embodiments method 1400 can include a block 1401 of receiving a plurality of labeled samples in a training database. In a number of embodiments, the training database can be similar or identical to training database 320 (FIG. 3). In several embodiments, each of the plurality of labeled samples can include a different data point and an assured output. In several embodiments, the assured output can correspond to the data point for the information extraction application. In many embodiments, the plurality of labeled samples can be received into the training database as shown in FIG. 4 and described above.

In a number of embodiments, method 1400 can continue by including blocks 1402-1405, which can be performed for each of the rules in the rule database. Block 1402 can include determining, for each of the data points of the plurality of labeled samples in the training database to which the rule applies, whether applying the rule to the data point has a positive impact on matching an output for the data point based on the rule to the assured output of the labeled sample corresponding to the data point, such that the data point is a positive voter, or whether applying the rule to the data point has a negative impact on matching the output for the data point based on the rule to the assured output of the labeled sample corresponding to the data point, such that the data point is a negative voter.

In some embodiments, block 1403 can include generating positive impact information for the rule based on the positive voters. In many embodiments, the positive impact information can include a quantity of the positive voters. In some embodiments, the quantity of the positive voters can be similar or identical to positive voter count 1032 (FIGS. 10-11) and/or positive voter count 1243 (FIGS. 12-13).

In a number of embodiments, block 1404 can include generating negative impact information for the rule based on the negative voters. In some embodiments, the negative impact information can include a quantity of the negative voters. In various embodiments, the quantity of the negative of the negative voters can be similar or identical to negative voter count 1034 (FIGS. 10-11) and/or negative voter count 1244 (FIGS. 12-13).

In a number of embodiments, block 1405 can include determining a metric for the rule. In many embodiments, the metric for the rule can be based on the quantity of the negative voters and the quantity of the positive voters. In some embodiments, the metric for the rule can be similar or identical to metric value 1245 (FIGS. 12-13). In certain embodiments, the metric for each of the rules can be based on a ratio of the quantity of the negative voters to the quantity of the positive voters.

In many embodiments, method 1400 can continue by including a block 1406 of ranking the rules based on the metrics corresponding to the rules. For example, the whitelist rules can be ranked based on the value of the metric corresponding to each whitelist rule and/or each blacklist rule.

In some embodiments, method 1400 can next include a block 1407 of sending to a user for refinement one or more flagged rules of the rules. In several embodiments, the one or more flagged rules can have the rules that have a lowest ranking of the metric. In many embodiments, the one or more flagged rules can be displayed in rule refinement listing 1240 (FIG. 12) and/or rule refinement listing 1340 (FIG. 13).

In many embodiments, method 1400 can continue by including a block 1408 of receiving from the user one or more refined rules. For example, the user can provide the one or more refined rules by editing one or more of boxes 620-623 (FIG. 8) of display window 800 (FIG. 8) and selecting save rule button 824 (FIG. 8), as described above.

In some embodiments, method 1400 can next include a block 1409 of generating a first output for a first data point in an information database based on the rules in the rules database. In many embodiments, the rules in the rules database can include the one or more refined rules. in several embodiments, the plurality of labeled samples in the training database can be devoid of the first data point.

In many embodiments, method 1400 can continue by including a block 1410 of receiving a request for information from a second user. For example, the second user can be a customer requesting information about a product.

In some embodiments, method 1400 can next include a block 1411 of presenting the first output to the second user in response to the request. In several embodiments, the first output can be presented to the second user by sending the output to the a device of the user for display on a screen of the device. In a number of embodiments, the first output can be presented to the second user by printing the first output for the user.

In various embodiments, method 1400 can include receiving from the user one of: (1) one or more updated rules that are a modification of the one or more flagged rules, or (2) a deletion of the one or more flagged rules. In some embodiments, the user can update one or more rules by editing one or more of boxes 620-623 (FIG. 8) of display window 800 (FIG. 8) and selecting save rule button 824 (FIG. 8). In many embodiments, the user can delete one or more rules by selecting delete rule button 826 (FIG. 8) of display window 800 (FIG. 8).

In various embodiments, method 1400 can include sending to the user one or more candidate outputs for each of the one or more flagged rules. In several embodiments, for each of the one or more flagged rules, the one or more candidate outputs can include one or more of the assured outputs of the plurality of labeled samples that most frequently correspond to the data points of the plurality of labeled samples to which the flagged rule applies. For example, the candidate outputs can be listing in candidate outputs listing 1246 (FIG. 12) of display window 1200 (FIG. 12).

In some embodiments, method 1400 can include iteratively sending to the user for refinement the one or more flagged rules of the rules that have the lowest ranking of the metric until the metric of a next lowest rule is within a predetermined threshold.

Figure 15:
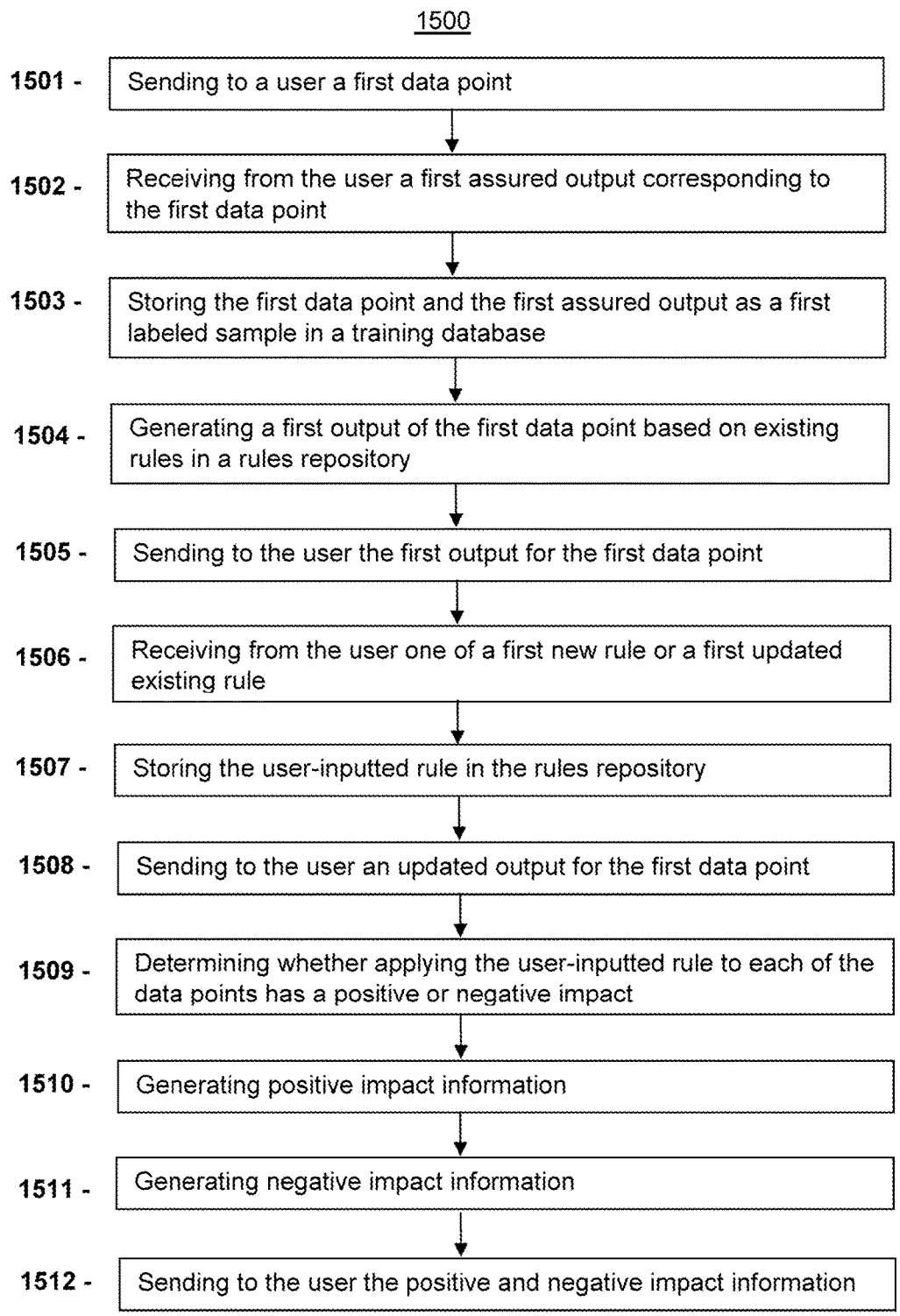
FIG. 15 illustrates a flow chart for a method of validating rules configured to be utilized in an information extraction application, according to another embodiment.

Turning ahead in the drawings, FIG. 15 illustrates a flow chart for a method 1500 of validating rules configured to be utilized in an information extraction application, according to an embodiment. Method 1500 is merely exemplary and is not limited to the embodiments presented herein. Method 1500 can be employed in many different embodiments or examples not specifically depicted or described herein. In some embodiments, the procedures, the processes, and/or the activities of method 1500 can be performed in the order presented. In other embodiments, the procedures, the processes, and/or the activities of method 1500 can be performed in any suitable order. In still other embodiments, one or more of the procedures, the processes, and/or the activities of method 1500 can be combined or skipped. In some embodiments, method 1500 can be implemented by information extraction system 300 (FIG. 3). In a number of embodiments, the information extraction application can be one of product type classification or data normalization.

Referring to FIG. 15, in some embodiments method 1500 can include a block 1501 of sending to a user a first data point for the information extraction application. In a number of embodiments, the first data point can be similar or identical to the data point in data point box 401 (FIG. 4), and can be sent to the user such as by displaying to the user display window 400 (FIG. 4).

In a number of embodiments, method 1500 can continue by including a block 1502 of receiving from the user a first assured output corresponding to the first data point for the information extraction application based on human knowledge of the user. In a number of embodiments, the first assured output can be received from the user such as through assured output box 402 (FIG. 4) of display window 400 (FIG. 4).

In many embodiments, method 1500 can next include a block 1503 of storing the first data point and the first assured output as a first labeled sample in a training database. In some embodiments, the training database can be similar or identical to training database 320 (FIG. 3). In various embodiments, the training database can include a plurality of labeled samples each for a different data point and an assured output. In a number of embodiments, the assured output can correspond to the first data point for the information extraction application.

In a number of embodiments, method 1500 can continue by including a block 1504 of generating a first output for the first data point based on a first set of rules in a rules database. In some embodiments, the rules database can be similar or identical to rules database 310 (FIG. 3). In several embodiments, the rules database can include the rules configured to be utilized in the information extraction application. In various embodiments, the rules in the rules database can include whitelist rules and blacklist rules.

In many embodiments, method 1500 can next include a block 1505 of sending to the user the first output for the first data point. In several embodiments, the first output for the first data point can be sent to the user by being displayed in generated output field 506 (FIG. 5), as shown in display window 500 (FIG. 5). In some embodiments, block 1505 can include sending to the user a listing of the rules that apply to the first data point. For example, the listing of the rules can be sent to the user by displaying the rules in applicable rules listing 510 (FIG. 5), as shown in display window 500 (FIG. 5).

In a number of embodiments, method 1500 can continue by including a block 1506 of receiving from the user one of: (1) a first new rule for the information extraction application of the first data point based on the human knowledge of the user, or (2) a first updated existing rule that is a modification of one of the first set of rules in the rule database. In some embodiments, the one of the first new rule or the first updated existing rule can be a user-inputted rule. In various embodiments, the user can provide the first new rule as shown in FIGS. 6-7 and described above. In some embodiments, the user can provide the first updated existing rule by editing one or more of boxes 620-623 (FIG. 8) of display window 800 (FIG. 8) and selecting save rule button 824 (FIG. 8), as described above.

In many embodiments, method 1500 can next include a block 1507 of storing the user-inputted rule in the rules database.

In a number of embodiments, method 1500 can continue by including a block 1508 of sending to the user an updated output for the first data point based on the rules in the rules database. In many embodiments, the rules in the rules database can include the user-inputted rule and/or the first set of rules. In several embodiments, the updated output for the first data point can be sent to the user by being displayed in generated output field 506 (FIG. 9) as shown in display window 900 (FIG. 9). In some embodiments, block 1508 can include sending to the user an updated listing of the rules that apply to the first data point. For example, the updated listing of the rules can be sent to the user by displaying the rules in applicable rules listing 510 (FIG. 9), as shown in display window 900 (FIG. 9).

In many embodiments, method 1500 can next include a block 1509 of determining, for each of the data points of the plurality of labeled samples in the training database to which the user-inputted rule applies, whether applying the user-inputted rule to the data point has a positive impact on matching an output for the data point based on the user-inputted rule to the assured output of the labeled sample corresponding to the data point, such that the data point is a positive voter, or whether applying the user-inputted rule to the data point has a negative impact on matching the output for the data point based on the user-inputted rule to the assured output of the labeled sample corresponding to the data point, such that the data point is a negative voter.

In a number of embodiments, method 1500 can continue by including a block 1510 of generating positive impact information for the user-inputted rule based on the positive voters. In many embodiments, the positive impact information can include a quantity of the positive voters. In some embodiments, the quantity of the positive voters can be similar or identical to positive voter count 1032 (FIGS. 10-11) and/or positive voter count 1243 (FIGS. 12-13). In several embodiments, the positive impact information can include a listing of the positive voters, such as positive impact listing 1031 (FIGS. 10-11).

In many embodiments, method 1500 can next include a block 1511 of generating negative impact information for the user-inputted rule based on the negative voters. In some embodiments, the negative impact information can include a quantity of the negative voters. In various embodiments, the quantity of the negative of the negative voters can be similar or identical to negative voter count 1034 (FIGS. 10-11) and/or negative voter count 1244 (FIGS. 12-13). In several embodiments, the negative impact information can include a listing of the negative voters, such as positive impact listing 1033 (FIGS. 10-11).

In some embodiments, method 1500 can continue by including a block 1512 of sending to the user the positive and negative impact information for the user-inputted rule. In several embodiments, the positive impact information for the user-inputted rule can be sent to the user by displaying the information in positive impact listing 1031 (FIGS. 10-11) and/or positive voter count 1032 (FIGS. 10-11), as shown in display window 1000 (FIG. 10) and display window 1100 (FIG. 11). In various embodiments, the negative impact information for the user-inputted rule can be sent to the user by displaying the information in negative impact listing 1033 (FIGS. 10-11) and/or negative voter count 1034 (FIGS. 10-11), as shown in display window 1000 (FIG. 10) and display window 1100 (FIG. 11).

In various embodiments, method 1500 can include receiving from the user one of: (1) a second new rule for the information extraction application of the data point based on the human knowledge of the user, or (2) a second updated existing rule that is a modification of one of the rules in the rule database. In various embodiments, the user can provide the second new rule as shown in FIGS. 6-7 and described above. In some embodiments, the user can provide the second updated existing rule by editing one or more of boxes 620-623 (FIG. 8) of display window 800 (FIG. 8) and selecting save rule button 824 (FIG. 8), as described above. In several embodiments, the second updated existing rule can be a modification of the user-inputted rule.

Returning to FIG. 3, in some embodiments, extraction engine 340 (FIG. 3) can perform block 1409 (FIG. 14) of generating a first output for a first data point in an information database based on the rules in the rules database and/or perform block 1504 (FIG. 15) of generating a first output for the first data point based on existing rules in a rules database. In a number of embodiments, information extraction system 300 can include a training module 351. In certain embodiments, training module 351 can perform block 1401 (FIG. 14) of receiving a plurality of labeled samples in a training database and/or block 1503 (FIG. 15) of storing the first data point and the first assured output as a first labeled sample in a training database.

In some embodiments, information extraction system 300 also can include an impact module 352. In certain embodiments, impact module 352 can perform block 1402 (FIG. 14) of determining, for each of the data points of the plurality of labeled samples in the training database to which the rule applies, whether applying the rule to the data point has a positive impact on matching an output for the data point based on the rule to the assured output of the labeled sample corresponding to the data point, such that the data point is a positive voter, or whether applying the inputted rule to the data point has a negative impact on matching the output for the data point based on the rule to the assured output of the labeled sample corresponding to the data point, such that the data point is a negative voter, perform block 1403 (FIG. 14) of generating positive impact information for the rule based on the positive voters, perform block 1404 (FIG. 14) of generating negative impact information for the rule based on the negative voters, perform block 1509 (FIG. 15) of determining, for each of the data points of the plurality of labeled samples in the training database to which the user-inputted rule applies, whether applying the user-inputted rule to the data point has a positive impact on matching an output for the data point based on the user-inputted rule to the assured output of the labeled sample corresponding to the data point, such that the data point is a positive voter, or whether applying the user-inputted rule to the data point has a negative impact on matching the output for the data point based on the user-inputted rule to the assured output of the labeled sample corresponding to the data point, such that the data point is a negative voter, perform block 1510 (FIG. 15) of generating positive impact information for the user-inputted rule based on the positive voters, and/or perform block 1511 (FIG. 15) of generating negative impact information for the user-inputted rule based on the negative voters.

In various embodiments, information extraction system 300 further can include a metric calculation module 353. In certain embodiments, metric calculation module 353 can perform block 1405 (FIG. 14) of include determining a metric for the rule.

In many embodiments, information extraction system 300 additionally can include a rule ranking module 354. In certain embodiments, rule ranking module 354 can perform block 1406 (FIG. 14) of ranking the rules based on the metrics corresponding to the rules.

In various embodiments, information extraction system 300 also can include a display module 355. In certain embodiments, display module 355 can perform block 1407

(FIG. 14) of sending to a user for refinement one or more flagged rules of the rules, perform block 1411 (FIG. 14) of presenting the first output to the second user in response to the request, perform block 1501 (FIG. 15) of sending to a user a first data point for the information extraction application, perform block 1505 (FIG. 15) of sending to the user the first output for the first data point, perform block 1508 (FIG. 15) of sending to the user an updated output for the first data point based on the rules in the rules database, and/or perform block 1512 (FIG. 15) of sending to the user the positive and negative impact information for the user-inputted rule.

In many embodiments, information extraction system 300 additionally can include an input module 356. In certain embodiments, input module 356 can perform block 1408 (FIG. 14) of receiving from the user one or more refined rules, perform block 1410 (FIG. 14) of receiving a request for information from a second user, perform block 1502 (FIG. 15) of receiving from the user a first assured output corresponding to the first data point for the information extraction application based on human knowledge of the user, perform block 1506 (FIG. 15) of receiving from the user one of: (1) a first new rule for the information extraction application of the first data point based on the human knowledge of the user, or (2) a first updated existing rule that is a modification of one of the existing rules in the rule database, and/or perform block 1507 (FIG. 15) of storing the user-inputted rule in the rules database.

Although automatic rule coaching has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-15 may be modified, and that the foregoing discussion of certain of these embodiments does not necessarily represent a complete description of all possible embodiments. For example, one or more of the procedures, processes, or activities of FIGS. 14-15 may include different procedures, processes, and/or activities and be performed by many different modules, in many different orders. As another example, the modules within information extraction system 300 in FIG. 3 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of validating rules configured to be utilized in an information extraction application, the rules being stored in a rules database, the method being implemented via execution of computer instructions configured to run at one or more processing modules and configured to be stored at one or more non-transitory memory storage modules, the method comprising:
receiving a plurality of labeled samples in a training database, each of the plurality of labeled samples comprising a different data point and an assured output, the assured output corresponding to the different data point for the information extraction application;
for each of the rules in the rules database:
determining, for each data point of the different data points of the plurality of labeled samples in the training database to which the rule applies, whether applying the rule to the data point has a positive impact on matching an output for the data point based on the rule to the assured output of the labeled sample corresponding to the data point, such that the data point is a positive voter, or whether applying the rule to the data point has a negative impact on matching the output for the data point based on the rule to the assured output of the labeled sample corresponding to the data point, such that the data point is a negative voter;
generating positive impact information for the rule based on the positive voters, wherein the positive impact information comprises a quantity of the positive voters;
generating negative impact information for the rule based on the negative voters, wherein the negative impact information comprises a quantity of the negative voters; and
determining a metric for the rule based on the quantity of the negative voters and the quantity of the positive voters;
ranking the rules based on the metrics corresponding to the rules;
sending to a user for refinement one or more flagged rules of the rules that have a lowest ranking of the metric;
receiving from the user one or more refined rules;
generating a first output for a first data point in an information database based on the rules in the rules database, the rules in the rules database comprising the one or more refined rules, the plurality of labeled samples in the training database being devoid of the first data point;
receiving a request for information from a second user; and
presenting the first output to the second user in response to the request.

2. The method of claim 1 further comprising:
receiving from the user one of: (1) one or more updated rules that are a modification of the one or more flagged rules, or (2) a deletion of the one or more flagged rules.

3. The method of claim 1 further comprising:
sending to the user one or more candidate outputs for each of the one or more flagged rules, wherein, for each of the one or more flagged rules, the one or more candidate outputs comprise one or more of the assured outputs of the plurality of labeled samples that most frequently correspond to the different data points of the plurality of labeled samples to which the flagged rule applies.

4. The method of claim 1 further comprising:
iteratively sending to the user for refinement the one or more flagged rules of the rules that have the lowest ranking of the metric until the metric of a next lowest rule is within a predetermined threshold.

5. The method of claim 1, wherein:
the metric for each of the rules is based on a ratio of the quantity of the negative voters to the quantity of the positive voters.

6. The method of claim 1, wherein:
the rules in the rules database comprise whitelist rules and blacklist rules.

7. The method of claim 1, wherein:
the information extraction application comprises product type classification.

8. The method of claim 1, wherein:
the information extraction application comprises data normalization.

9. A method of validating rules configured to be utilized in an information extraction application, the method being implemented via execution of computer instructions configured to run at one or more processing modules and configured to be stored at one or more non-transitory memory storage modules, the method comprising:
sending to a user a first data point for the information extraction application;
receiving from the user a first assured output corresponding to the first data point for the information extraction application based on human knowledge of the user;
storing the first data point and the first assured output as a first labeled sample in a training database, the training database comprising a plurality of labeled samples each for a different data point and an assured output, the assured output corresponding to the different data point for the information extraction application;
generating a first output for the first data point based on a first set of rules in a rules database comprising the rules configured to be utilized in the information extraction application;
sending to the user the first output for the first data point;
receiving from the user one of: (1) a first new rule for the information extraction application of the first data point based on the human knowledge of the user, or (2) a first updated existing rule that is a modification of one of the first set of rules in the rules database, one of the first new rule or the first updated existing rule being a user-inputted rule;
storing the user-inputted rule in the rules database;
sending to the user an updated output for the first data point based on the rules in the rules database; the rules in the rules database comprising the user-inputted rule and the first set of rules;
determining, for each data point of the different data points of the plurality of labeled samples in the training database to which the user-inputted rule applies, whether applying the user-inputted rule to the data point has a positive impact on matching an output for the data point based on the user-inputted rule to the assured output of the labeled sample corresponding to the data point, such that the data point is a positive voter, or whether applying the user-inputted rule to the data point has a negative impact on matching the output for the data point based on the user-inputted rule to the assured output of the labeled sample corresponding to the data point, such that the data point is a negative voter;
generating positive impact information for the user-inputted rule based on the positive voters;
generating negative impact information for the user-inputted rule based on the negative voters; and
sending to the user the positive and negative impact information for the user-inputted rule.

10. The method of claim 9 further comprising:
receiving from the user one of: (1) a second new rule for the information extraction application of the first data point based on the human knowledge of the user, or (2) a second updated existing rule that is a modification of one of the rules in the rules database.

11. The method of claim 10, wherein:
the second updated existing rule is a modification of the user-inputted rule.

12. The method of claim 9, wherein:
sending to the user the first output for the first data point further comprises:
sending to the user a listing of the rules that apply to the first data point; and
sending to the user the updated output for the first data point based on the rules in the rules database comprises:
sending to the user an updated listing of the rules that apply to the first data point.

13. The method of claim 9, wherein:
the positive impact information comprises a quantity of the positive voters; and
the negative impact information comprises a quantity of the negative voters.

14. The method of claim 9, wherein:
the positive impact information comprises a listing of the positive voters; and
the negative impact information comprises a listing of the negative voters.

15. The method of claim 9, wherein:
the rules in the rules database comprise whitelist rules and blacklist rules.

16. The method of claim 9, wherein:
the information extraction application comprises one of product type classification or data normalization.

17. A system for validating rules configured to be utilized in an information extraction application, the rules being stored in a rules database, the system comprising:
one or more processing modules; and
one or more non-transitory memory storage modules storing computing instructions configured to run on the one or more processing modules and perform:
receiving a plurality of labeled samples in a training database, each of the plurality of labeled samples comprising a different data point and an assured output, the assured output corresponding to the different data point for the information extraction application;
for each of the rules in the rules database:
determining, for each data point of the different data points of the plurality of labeled samples in the training database to which the rule applies, whether applying the rule to the data point has a positive impact on matching an output for the data point based on the rule to the assured output of the labeled sample corresponding to the data point, such that the data point is a positive voter, or whether applying the rule to the data point has a negative impact on matching the output for the data point based on the rule to the assured output of the labeled sample corresponding to the data point, such that the data point is a negative voter;

generating positive impact information for the rule based on the positive voters, wherein the positive impact information comprises a quantity of the positive voters;

generating negative impact information for the rule based on the negative voters, wherein the negative impact information comprises a quantity of the negative voters; and determining a metric for the rule based on the quantity of the negative voters and the quantity of the positive voters;

ranking the rules based on the metrics corresponding to the rules;

sending to a user for refinement one or more flagged rules of the rules that have a lowest ranking of the metric;

receiving from the user one or more refined rules;

generating a first output for a first data point in an information database based on the rules in the rules database, the rules in the rules database comprising the one or more refined rules, the plurality of labeled samples in the training database being devoid of the first data point;

receiving a request for information from a second user; and presenting the first output to the second user in response to the request.

18. The system of claim 17, wherein the computing instructions are further configured to perform:

receiving from the user one of: (1) one or more updated rules that are a modification of the one or more flagged rules, or (2) a deletion of the one or more flagged rules.

19. The system of claim 17, wherein the computing instructions are further configured to perform:

sending to the user one or more candidate outputs for each of the one or more flagged rules, wherein, for each of the one or more flagged rules, the one or more candidate outputs comprise one or more of the assured outputs of the plurality of labeled samples that most frequently correspond to the different data points of the plurality of labeled samples to which the flagged rule applies.

20. The system of claim 17, wherein the computing instructions are further configured to perform:

iteratively sending to the user for refinement the one or more flagged rules of the rules that have the lowest ranking of the metric until the metric of a next lowest rule is within a predetermined threshold.

* * * * *